(12) United States Patent
Lin

(10) Patent No.: US 7,570,462 B2
(45) Date of Patent: Aug. 4, 2009

(54) READ SENSOR WITH A UNIFORM LONGITUDINAL BIAS STACK

(75) Inventor: Tsann Lin, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/128,188

(22) Filed: May 28, 2008

(65) Prior Publication Data
US 2008/0218914 A1   Sep. 11, 2008

Related U.S. Application Data

(62) Division of application No. 11/065,225, filed on Feb. 23, 2005, now Pat. No. 7,394,624.

(51) Int. Cl.
*G11B 5/127* (2006.01)
(52) U.S. Cl. .................................. 360/324.12
(58) Field of Classification Search .............. None
See application file for complete search history.

(56) References Cited

U.S. PATENT DOCUMENTS 7,242,556 B2 * 7/2007 Gill ..................... 360/324.12
7,397,637 B2 * 7/2008 Gill ..................... 360/324.12
2005/0280957 A1 * 12/2005 Gill ..................... 360/324.12
2006/0044708 A1 * 3/2006 Gill ..................... 360/324.12

* cited by examiner

*Primary Examiner*—Mark Blouin
(74) *Attorney, Agent, or Firm*—Zilka-Kotab, PC

(57) ABSTRACT

A read sensor with a uniform longitudinal bias (LB) stack is proposed. The read sensor is a giant magnetoresistance (GMR) sensor used in a current-in-plane (CIP) or a current-perpendicular-to-plane (CPP) mode, or a tunneling magnetoresistance (TMR) sensor used in the CPP mode. The transverse pinning layer of the read sensor is made of an antiferromagnetic Pt—Mn, Ir—Mn or Ir—Mn—Cr film. In one embodiment of this invention, the uniform LB stack comprises a longitudinal pinning layer, preferable made of an antiferromagnetic Ir—Mn—Cr or Ir—Mn film, in direct contact with and exchange-coupled to sense layers of the read sensor. In another embodiment of the present invention, the uniform LB stack comprises the Ir—Mn—Cr or Ir—Mn longitudinal pinning layer exchange coupled to a ferromagnetic longitudinal pinned layer, and a nonmagnetic antiparallel-coupling spacer layer sandwiched between and the ferromagnetic longitudinal pinned layer and the sense layers.

14 Claims, 14 Drawing Sheets

| SIDE REGION | READ REGION | SIDE REGION |

READ SENSOR WITH A UNIFORM LONGITUDINAL BIAS STACK

RELATED INVENTIONS

This is Application is a Divisional Application of U.S. patent application Ser. No. 11/065,225, entitled A READ SENSOR WITH UNIFORM LONGITUDINAL BIAS STACK, filed Feb. 23, 2005 now U.S. Pat. No. 7,394,624, which is incorporated herein by reference as if fully set forth herein.

FIELD OF THE INVENTION

The present invention relates to a read sensor with ferromagnetic sense layers directly stabilized by a uniform longitudinal bias stack. The read sensor is either a giant magnetoresistance (GMR) sensor used in a current-in-plane (CIP) or a current-perpendicular-to-plane (CPP) mode, or a tunneling magnetoresistance (TMR) sensor used in a CPP mode. The longitudinal bias stack mainly comprises an antiferromagnetic Ir—Mn—Cr film.

BACKGROUND OF THE INVENTION

The heart of a computer is a magnetic disk drive. The magnetic disk drive includes a rotating magnetic disk, a write/read head assembly that is suspended by a suspension arm adjacent to a surface of the rotating magnetic disk, and an actuator that swings the suspension arm to place the write/read head assembly over selected circular tracks on the rotating magnetic disk. The write/read head assembly is directly located on a slider that has an air bearing surface (ABS) facing the surface of the magnetic disk. When the magnetic disk is stationary, the suspension arm biases the slider into contact with the surface of the magnetic disk. When the magnetic disk rotates, air is swirled by the rotating magnetic disk. When the slider rides on the air bearing, the write/read assembly is employed for writing magnetic impressions to and reading magnetic impressions from the rotating magnetic disk. The write/read head assembly is connected to processing circuitry that operates according to a computer program to implement the write and read functions.

The write/read head assembly includes a write head and a read head. The write head includes first and second write-pole layers, a write-gap layer, a coil layer, and first, second and third insulation layers (an insulation stack). The write-gap layer, coil layer and insulation stack are sandwiched between the first and second write-pole layers. The first and second write-pole layers are connected at the back of the write head. Current conducted to the coil layer induces a magnetic flux in the first and second write-pole layers which cause a magnetic field to fringe out at the ABS of the write head for the purpose of writing the aforementioned magnetic impressions in circular data tracks on the aforementioned rotating magnetic disk.

Referring now to FIG. 1, there is shown a magnetic disk drive 100 embodying this invention. As shown in FIG. 1, at least one rotatable magnetic disk 112 is supported on a spindle 114 and rotated by a disk drive motor 118. The magnetic recording is conducted by writing and reading circular data tracks (not shown) on the rotating magnetic disk 112.

At least one slider 113 is positioned near the magnetic disk 112, each slider 113 supporting one or more write/read head assemblies 121. As the magnetic disk 112 rotates, the slider 113 moves radially in and out over the disk surface 122 so that the write/read head assembly 121 may access different circular data tracks on the disk surface 122. Each slider 113 is attached to an actuator arm 119 with a suspension 115. The suspension 115 provides a slight spring force which biases the slider 113 against the disk surface 122. Each actuator arm 119 is connected with a voice coil motor (VCM) 127. The VCM 127 comprises a coil movable within a fixed magnetic field, the direction and speed of the coil movements being controlled by the motor current signals supplied by a control unit 129.

During operation of the magnetic disk drive 100, the rotation of the magnetic disk 112 generates an air bearing between the slider 113 and the disk surface 122, which exerts an upward force or lift on the slider 113. The air bearing thus counter-balances the slight spring force of the suspension 115 and supports the slider 113 off and slightly above the disk surface 122 by a small, substantially constant spacing during normal operation.

The various components of the magnetic disk drive 100 are controlled in operation by control signals generated by the control unit 129, such as access control signals and internal clock signals. Typically, the control unit 129 comprises logic control circuits, storage means and a microprocessor. The control unit 129 generates control signals to control various system operations such as drive motor control signals on line 123, and head position and seek control signals on line 128. The control signals on line 128 provide the desired current profiles to optimally move and position the slider 113 to the desired circular data track on the disk surface 122. Write and read signals are communicated to and from the write/read head assembly 121 with a recording channel 125.

With reference to FIG. 2, the orientation of the write/read head assembly 121 in the slider 113 can be seen in more detail. FIG. 2 is an ABS view of the slider 113, and as can be seen, the write/read head assembly 121, including a write head and a read head, is located at a trailing edge of the slider 113. The above description of a typical magnetic disk drive 100, and the accompanying illustration of FIGS. 1 and 2 are for representation purposes only. It should be apparent that this invention may be embodied in other data storage systems similar to the magnetic disk drive 100. These data storage systems may contain a large number of magnetic disks and actuators, and each actuator may support a number of sliders.

A read head commonly used in a current-in-plane (CIP) mode, as shown in FIG. 3, includes first and second magnetic-shield layers (not shown), first and second read-gap layers 326, 328, a giant magnetoresistance (GMR) sensor 302 in a read region, longitudinal bias layers 330 in two side regions, and conductor layers 332 also in the two side regions. The GMR sensor 302, the longitudinal bias layers 330, and the conductor layers 332 are sandwiched between the first and second read-gap layers 326, 328, which are in turn sandwiched between the first and second magnetic-shield layers (not shown). A commonly used GMR sensor 302 comprises Al—O/Ni—Cr—Fe/Ni—Fe seed layers 322, an antiferromagnetic Pt—Mn transverse pinning layer 316, a synthetic pinned-layer structure 306 (comprising a ferromagnetic Co—Fe first pinned layer 310 with a magnetization 318, a nonmagnetic Ru spacer layer 314, and a ferromagnetic Co—Fe second pinned layer 312 with a magnetization 320), a nonmagnetic conducting Cu—O spacer layer 308, ferromagnetic Co—Fe/Ni—Fe sense layers 304 with a magnetization 336, and a nonmagnetic Ta cap layer 324. In a quiescent position when a sense current is conducted through the GMR sensor 302, the magnetization 318 of the Co—Fe first pinned layer 310 is rigidly pinned in a transverse direction perpendicular to and away from the ABS, the magnetization 320 of the Co—Fe second pinned layer 312 is also rigidly pinned in a direction perpendicular to but toward the ABS, and the magnetization 336 of the Co—Fe/Ni—Fe sense layers 304 is oriented in a longitudinal direction parallel to the ABS. During sensor operation, only the magnetization 336 of the Co—Fe/Ni—Fe sense layers 304 is free to rotate in positive and negative directions from the quiescent position in response to positive and negative magnetic signal fields from the adjacent rotating magnetic disk.

The thickness of the Cu—O spacer layer 308 is chosen to be less than the mean free path of conduction electrons through the GMR sensor 302. With this arrangement, a portion of the conduction electrons is scattered by the interfaces of the Cu—O spacer layer 308 with the Co—Fe second pinned layer 312 and with the Co—Fe/Ni—Fe sense layers 304. When the magnetization 320 of the Co—Fe second pinned layer 312 and the magnetization 336 of the Co—Fe/Ni—Fe sense layers 304 are parallel to each other, scattering is minimal. When the magnetizations 320, 336 are antiparallel to each other, scattering is maximal. Changes in scattering alter the resistance of the GMR sensor 302 in proportion to cos θ, where θ is the angle between the magnetizations 320, 336. During sensor operation, the resistance of the GMR sensor 302 changes proportionally to the magnitudes of the magnetic fields from the rotating magnetic disk, and these resistance changes cause potential changes that are detected and processed as playback signals.

In the prior-art fabrication process of the GMR sensor 302 abutted with the longitudinal bias layers 330 and conductor layers 332 in the two side regions, as shown in FIG. 3, the GMR sensor 302 comprising Al—O(3)/Ni—Cr—Fe(3)/Ni—Fe(0.4)/Pt—Mn(15)/Co—Fe(1.6)/Ru(0.8)/Co—Fe(1.6)/Cu—O(1.8)/Co—Fe(1)/Ni—Fe(1.6)/Ta(4) films (thickness in nm) is deposited in a deposition field of 100 Oe on a 8.2 nm thick $Al_2O_3$ first read-gap layer 326. A transverse-field anneal is applied in a field of 50,000 Oe for 5 hours at 265° C. in a direction perpendicular to the deposition field. A monolayer photoresist is applied and patterned in a photolithographic tool to mask the GMR sensor 302 in a read region. Ion milling is then applied to entirely remove the GMR sensor 302 and partially remove the $Al_2O_3$ first read-gap layer in two exposed side regions, in order to form sharp contiguous junctions. Longitudinal bias and conductor layers 330, 332, comprising Cr(15)/Co—Pt—Cr(10)/Rh(45) films are then deposited into the two exposed side regions, preferably with ion-beam sputtering at a normal angle for abutting the GMR sensor 302. The monolayer photoresist is lifted off with assistance of chemical mechanical polishing (CMP). After a subsequent similar patterning process, recessed conductor layers comprising Ta(10)/Cu(60)/Ta(10) films (not shown) are deposited. After a monolayer photoresist is lifted off, a 8.2 nm thick $Al_2O_3$ second read-gap layer 328 is then deposited.

The GMR sensor 302 requires the transverse-field anneal to develop strong antiferromagnetic/ferromagnetic coupling between the Pt—Mn transverse pinning layer 316 and Co—Fe first pinned layer 310. The anneal field must exceed the saturation field ($H_S$) of antiparallel (AP) ferromagnetic/ferromagnetic coupling across the Ru spacer layer 314 (~8,000 Oe) for aligning the magnetization 318 of the Co—Fe first pinned layer 310 and the magnetization 320 of the Co—Fe second pinned layer 312 in the transverse direction. After cooling to room temperature, the magnetization 318 is rigidly pinned by the Pt—Mn transverse pinning layer 316 in the transverse direction, while the magnetization 320 is rotated by 180°. A transverse flux closure will be formed between the magnetizations 318 and 320 after patterning, resulting in a small net magnetization in the Co—Fe/Ru/Co—Fe synthetic pinned-layer structure 306. This small net magnetization induces a small demagnetizing field ($H_D$) in the Co—Fe/Ni—Fe sense layers 304.

In this GMR sensor 302, antiferromagnetic/ferromagnetic coupling occurs between the Pt—Mn transverse pinning layer 316 and the Co—Fe/Ru/Co—Fe pinned-layer structure 306, producing a pinning field ($H_P$). This $H_P$ must be high enough to rigidly pin the magnetizations 318 and 320 of the Co—Fe/Ru/Co—Fe pinned layer structure 306 for proper sensor operation. Ferromagnetic/ferromagnetic coupling also occurs across the Cu—O spacer layer 308, producing a negative ferromagnetic coupling field ($H_F$). This $H_F$ must be precisely controlled so that the sum of $H_F$ and $H_D$ counterbalances a current-induced field ($H_I$) in the Co—Fe/Ni—Fe sense layers 304 ($H_F+H_D=H_I$), thereby orienting the magnetization 336 of the Co—Fe/Ni—Fe sense layers 304 in a longitudinal direction parallel to the ABS for optimally biased sensor operation. In a quiescent position, this GMR sensor 302 exhibits a resistance of $R_o+R_A+(\frac{1}{2})R_G$, where $R_o$ is a nonmagnetic resistance, $R_A$ is the maximum anisotropy magnetoresistance (AMR) of the Co—Fe/Ni—Fe sense layers 304, and $R_G$ is the maximum giant magnetoresistance (GMR) resistance. When receiving a signal field from a rotating magnetic disk, the magnetization 336 rotates from the longitudinal direction, while the magnetizations 318, 320 remain unchanged. The rotation of the magnetization 336 changes the resistance of the GMR sensor 302 by $\pm\Delta R_G \sin \theta_1 - \Delta R_A \sin^2 \theta_1$, where $\theta_1$ is a rotation angle.

There are several disadvantages in the use of the GMR sensor with this hard magnetic stabilization scheme, as described in the prior art. First, to attain stable GMR responses, the Cr film in the side regions must be deposited thick enough to align the midplane of the Co—Pt—Cr hard magnetic layer with that of the Co—Fe/Ni—Fe sense layers of the GMR sensor, and thus the Cr film at the contiguous junctions is inevitably thick. As a result, the separation between the sense layers and the Co—Pt—Cr hard magnetic layer becomes large, and the stabilization efficiency is substantially reduced. Second, the Rh conductor layer must be thick enough to provide a low-resistance path, and thus substantial overhangs at sides of the monolayer photoresist are formed. As a result, the liftoff process becomes difficult, and the sensor width cannot be precisely determined. Third, the CMP is typically applied to facilitate the liftoff process, and thus possible damages to the Co—Fe/Ni—Fe sense layers remain a concern. Fourth, in this hard magnetic stabilization scheme, longitudinal bias fields provided by the Co—Pt—Cr hard magnetic layer are very non-uniform, which are high at edges of the sense layers, causing difficulties in rotating the magnetization of the sense layers, and are low at the center of the sense layers, causing difficulties in stabilizing, the sense layers.

On the other hand, a read head 400 recently used in a current-perpendicular-to-plane (CPP) mode, as shown in FIG. 4, includes first and second magnetic-shield layers 426, 428, a tunneling magnetoresistance (TMR) sensor 402 (or a GMR sensor 402), a longitudinal bias (LB) stack 440, and insulating layers 430. The TMR sensor 402 is connected with the first magnetic-shield layer 426 and overlaid with the LB stack 440, which is connected with the second magnetic-shield layer 428.

The TMR sensor 402 comprises a Ta seed layer 422, an antiferromagnetic Pt—Mn transverse pinning layer 416, a synthetic pinned layer structure 406 (comprising a ferromagnetic Co—Fe first pinned layer 410 having a magnetization 418, a nonmagnetic Ru spacer layer 414, and a ferromagnetic Co—Fe second pinned layer 412 having a magnetization 420), a nonmagnetic insulating Al—O barrier layer 408, ferromagnetic Co—Fe/Ni—Fe sense layers 404 having a magnetization 436, and a nonmagnetic Cu cap layer 424. A recently used LB stack 440 comprises a nonmagnetic Ru seed layer 442, a ferromagnetic Co—Fe longitudinal pinned layer 444 having a magnetization 438, an antiferromagnetic Ir—Mn longitudinal pinning layer 446, and a nonmagnetic Ta cap layer 448.

In the prior-art fabrication process of a TMR sensor 402 overlaid with an LB stack 440 in a read region and abutted with insulating layers in two side regions, as shown in FIG. 4, the TMR sensor 402 comprising Ta(6)/Pt—Mn(15)/Co—Fe (1.6)/Ru(0.8)/Co—Fe(1.8)/Al—O(0.8)/Co—Fe(1)/Ni—Fe (1.6)/Cu(2) films is deposited in a deposition field of 100 Oe on a 1 μm thick Ni—Fe first magnetic-shield layer 426. The LB stack 440 comprising Ru(1)/Co—Fe(2.8)/Ir—Mn(7.5)/Ta(10) films is then subsequently deposited in the same deposition field on the TMR sensor. A transverse-field anneal is applied in a field of 50,000 Oe for 5 hours at 265° C. in a direction perpendicular to the deposition field. A longitudinal-field anneal is then applied in a field of 200 Oe for 2 hours at 240° C. in a directional antiparallel to the deposition field. A monolayer photoresist is applied and patterned in a photolithographic tool to mask the TMR sensor 402 and the LB stack 440 in a read region. Ion milling is then applied to entirely remove the LB stack 440 and the TMR sensor 402, and partially remove the Ni—Fe first magnetic-shield layer 426 in two exposed side regions. A 50 nm thick $Al_2O_3$ insulating layer 430 is then deposited into the two exposed side regions. The monolayer photoresist is lifted off, with assistance of CMP, and a 1 μm thick Ni—Fe second magnetic-shield layer 428 is then deposited.

The TMR sensor 402 requires the transverse-field anneal to develop strong antiferromagnetic/ferromagnetic coupling between the Pt—Mn transverse pinning layer 416 and the Co—Fe first pinned layer 410. The anneal field must exceed the saturation field ($H_S$) of AP ferromagnetic/ferromagnetic coupling across the Ru spacer layer 414 (~8,000 Oe) for aligning the magnetization 418 of the Co—Fe first pinned layer 410 and the magnetization 420 of the Co—Fe second pinned layer 412. After cooling to room temperature, the magnetization 418 is rigidly pinned by the Pt—Mn transverse pinning layer 416 in the transverse direction, while the magnetization 420 is rotated by 180°. A transverse flux closure will be formed between the magnetizations 418 and 420 after patterning, resulting in a small net magnetization in the Co—Fe/Ru/Co—Fe synthetic pinned-layer structure 406. This small net magnetization induces a small demagnetizing field ($H_D$) in the Co—Fe/Ni—Fe sense layers 404.

The LB stack 440 requires the longitudinal-field anneal to establish strong ferromagnetic/anti ferromagnetic coupling between the Co—Fe longitudinal pinned layer 444 and the Ir—Mn longitudinal pinning layer 446. The anneal field only needs to exceed the unidirectional anisotropy field ($H_{UA}$) of the as-deposited Co—Fe longitudinal pinned and Ir—Mn longitudinal pinning layers 444, 446 (about 100 Oe) at 240° C. for aligning the magnetization 438 of the Co—Fe longitudinal pinned layer 444 in a directional antiparallel to the deposition field. After cooling to room temperature, the magnetization 438 of the Co—Fe longitudinal pinned layer 444 is rigidly pinned by the Ir—Mn longitudinal pinning layer 446. As a result, a longitudinal flux closure will be formed between the magnetization 438 of the Co—Fe longitudinal pinned layer 444 and the magnetization 436 of the Co—Fe/Ni—Fe sense layers 404 after patterning, inducing magnetostatic interaction needed for stabilizing the Co—Fe/Ni—Fe sense layers 404. Since this anneal field is much lower than the spin-flop field ($H_{SF}$) of AP coupling across the Ru spacer layer 444 (~1,000 Oe), the transverse flux closure between the magnetization 418 of the Co—Fe first pinned layer 410 and the magnetization 420 of the Co—Fe second pinned layer 412 is not interrupted.

In this TMR sensor 402, antiferromagnetic/ferromagnetic coupling occurs between the Pt—Mn transverse pinning layer 416 and the Co—Fe/Ru/Co—Fe synthetic pinned layer structure 406, producing a transverse pinning field ($H_P$). This Hp must be high enough to rigidly pin the magnetizations 418 and 420 of the Co—Fe/Ru/Co—Fe synthetic pinned layer structure 406 for proper sensor operation. Ferromagnetic/ferromagnetic coupling also occurs across the Al—O spacer layer, producing a positive ferromagnetic coupling field ($H_F$). This $H_F$ must be precisely controlled to counterbalance $H_D$ in the Co—Fe/Ni—Fe sense layers 404 ($H_F=H_D$), thereby orienting the magnetization 436 of the Co—Fe/Ni—Fe sense layers 404 in a longitudinal direction parallel to the ABS for optimally biased sensor operation. In a quiescent position, this TMR sensor 402 exhibits a resistance of $R_o+(\frac{1}{2})\Delta R_T$, where $R_o$ is a nonmagnetic resistance, $\Delta R_T$ is the maximum tunneling magnetoresistance (TMR) resistance. When receiving a signal field from a rotating magnetic disk, the magnetization 436 rotates from the longitudinal direction, while the magnetizations 418, 420 and 438 remain unchanged. The rotation of the magnetization 436 changes the resistance of the TMR sensor 402 by $\pm\Delta R_T \sin \theta_1$, where $\theta_1$ is a rotation angle.

There are several disadvantages in the use of the TMR sensor with the antiferromagnetic stabilization scheme, as described in the prior art. First, the Pt—Mn transverse and Ir—Mn longitudinal pinning layers require the transverse-field and longitudinal-field anneals, respectively. While it is feasible to achieve the coexistence of the transverse and longitudinal flux closures with this dual-anneal approach, it appears difficult in attaining a very high $H_{UA}$ needed for the longitudinal flux closure due to the inherent weaker antiferromagnetism in the Ir—Mn longitudinal pinning layer than the Pt—Mn transverse pinning layer. Second, it is challenging to precisely control the total thickness of nonmagnetic Cu and Ru films used as decoupling layers. The Cu decoupling layer is needed to control the magnetostriction of the underlying sense layers, while the Ru decoupling layer is needed to facilitate the LB stack to attain a high $H_{UA}$. Their total thickness should be optimized in order to diminish ferromagnetic/ferromagnetic coupling between the sense and longitudinal pinned layers, while still ensuring strong magnetostatic interactions between the sense and longitudinal pinned layers. Third, in this antiferromagnetic stabilization scheme, longitudinal bias fields provided by the LB stack are very non-uniform, which are high at edges of the sense layers, causing difficulties in rotating the magnetization of the sense layers, and are low at the center of the sense layers, causing difficulties in stabilizing the sense layers.

In order to meet the ever increasing demand for improved data rate and data capacity, researchers have found ways to make the read sensor ever smaller. For instance, by reducing the sensor width, researchers have been able to fit ever more tracks of data onto a given area of a magnetic disk. However, as the sensor widths decrease, the traditional hard stabilization scheme for the GMR sensor used in the CIP mode, and the antiferromagnetic stabilization scheme for either the GMR or TMR sensor used in the CPP mode, as described previously, become insufficient to stabilize the sense layers. As discussed above, in the traditional hard stabilization and antiferromagnetic stabilization schemes, longitudinal bias layers magnetostatically couple to the outer side edges of the sense layers, providing strong longitudinal bias fields at edges of the read sensor. However, these longitudinal bias fields decay significantly toward the center of the read sensor. As the read sensor is made narrower, the demagnetizing field within the read sensor substantially increases, thus causing more difficulties in stabilizing the sense layers. Hence, a novel stabilization scheme is needed very much for the ever narrowed read sensor.

SUMMARY OF THE INVENTION

The present invention provides a read sensor, such as a giant magnetoresistance (GMR) sensor used in a current-in-plane (CIP) or a current-perpendicular-to-plane (CPP) mode, or a tunneling magnetoresistance (TMR) sensor used in a CPP mode, with a uniform longitudinal bias (LB) stack. The read sensor mainly includes ferromagnetic sense layers, a synthetic pinned layer structure, and a spacer layer disposed therebetween. In the uniform LB stack of one embodiment of this invention, an antiferromagnetic Ir—Mn—Cr pinning layer is used to directly contact and exchange-couple to the sense layers. In the uniform LB stack of another embodiment of this invention, the antiferromagnetic Ir—Mn—Cr pinning layer is used to contact and exchange-couple to a ferromagnetic Ni—Fe longitudinal pinned layer, and a nonmagnetic Ru spacer layer is sandwiched between the ferromagnetic Ni—Fe longitudinal pinned layer and the ferromagnetic sense layers for causing antiparallel exchange coupling across the Ru spacer layer. Both the read sensor and the uniform LB stack are located in a read region, The read sensor and uniform LB stack may contact directly with conducting layers in two side regions. The Cr/Co—Pt—Cr longitudinal bias layers used in the two side regions for the hard magnetic stabilization scheme may be included in addition to the uniform LB stack, but are preferably eliminated, since the uniform LB stack has been sufficient to stabilize the sense layers with a novel antiferromagnetic stabilization scheme.

The present invention advantageously eliminates problems resulting from complicated magnetics at edges of the read sensor, and the sensor width can be precisely controlled. The read sensor according to the present invention is thus advantageous for magnetic recording at ultrahigh densities.

The transverse pinning layer may be made of a Pt—Mn, Ir—Mn or Ir—Mn—Cr film, while the longitudinal pinning layer may be made of either an Ir—Mn or Ir—Mn—Cr film. Two anneals are applied in the fabrication processes of the read sensor, one for the formation of a transverse flux closure and the other for establishing longitudinal bias. A method of optimizing a longitudinal bias field needed for stabilizing the sense layers is proposed.

For each of the Pt—Mn, Ir—Mn and Ir—Mn—Cr transverse pinning layers, four types of read sensors may be used. The first and the second may include a bottom-type read sensor, in which the transverse pinning layer is located below the sense layers. In the first type of read sensor, the sense layers are overlaid with an LB stack, which comprises the Ir—Mn or Ir-M-Cr longitudinal pinning layer. In the second type of read sensor, the sense layers are overlaid with an LB stack, which comprises a nonmagnetic Ru spacer layer, a ferromagnetic Ni—Fe or Co—Fe longitudinal pinned layer, and the Ir—Mn or Ir-M-Cr longitudinal pinning layer. The third and the fourth may include a top-type read sensor, in which the transverse pinning layer is located above the sense layers. In the third type of read sensor, the sense layers overlie an LB stack, which comprises the Ir—Mn or Ir-M-Cr longitudinal pinning layer. In the fourth type of read sensor, the sense layers overlie an LB stack, which comprises the Ir—Mn or Ir-M-Cr longitudinal pinning layer, the Ni—Fe or Co—Fe longitudinal pinned layer, and the nonmagnetic Ru spacer layer.

The LB stack of this invention advantageously provides a uniform longitudinal bias field for stabilizing the sense layers across the entire width of the read sensor. This and other features and advantages of the invention will become apparent upon further reading of the Detailed Description in conjunction with the Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

The read head mainly includes a read sensor and a uniform LB stack, which are fabricated according to this invention. The read sensor can be either a giant magnetoresistance (GMR) sensor used in either a current-in-plane (CIP) or current-perpendicular-to-plane (CPP) mode, or a tunneling magnetoresistance (TMR) sensor used in either the CPP mode. For purposes of illustration, only the GMR sensor used in the CIP mode will be described.

Figure 1:
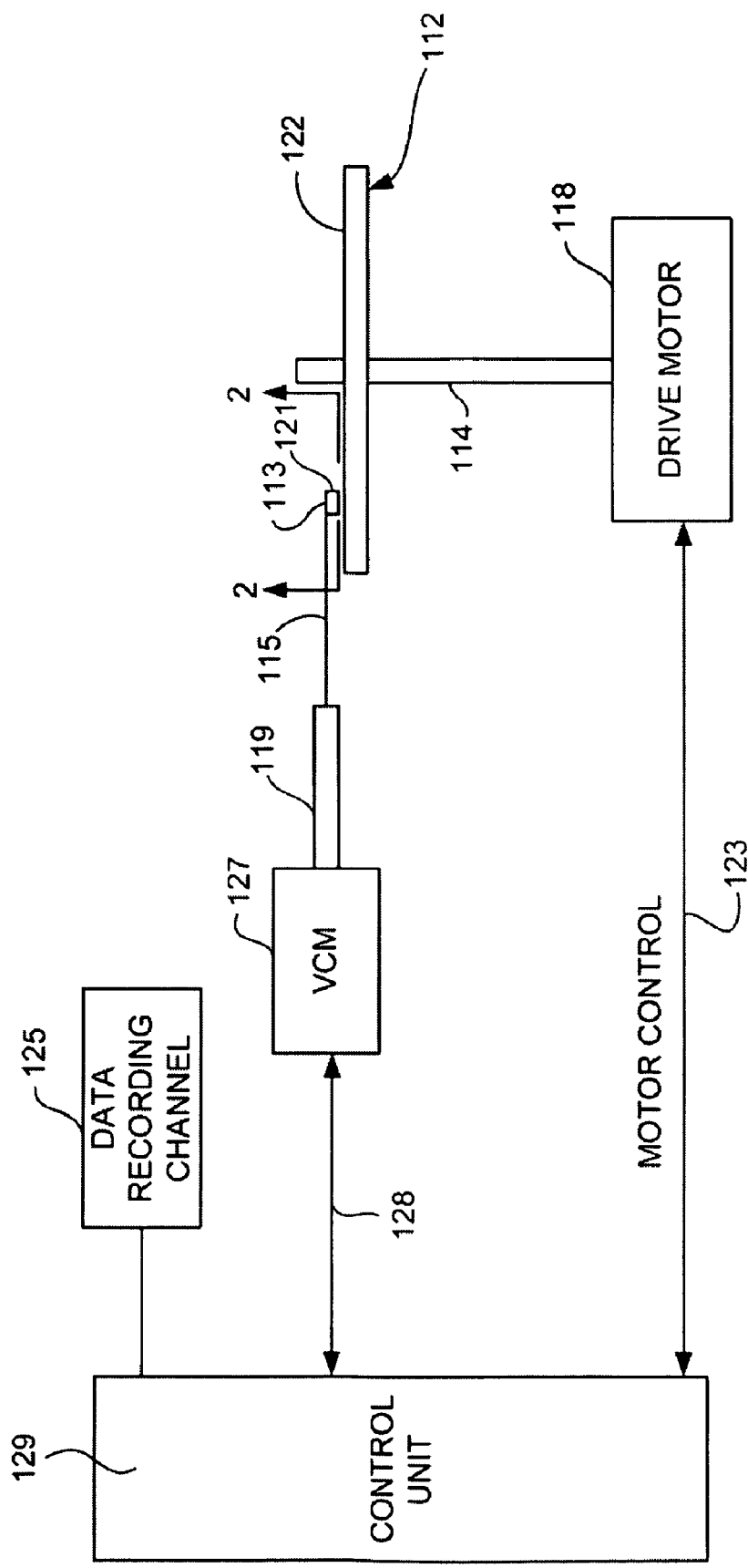
FIG. 1 is a schematic illustration of a magnetic disk drive in which this invention may be embodied.
Figure 2:
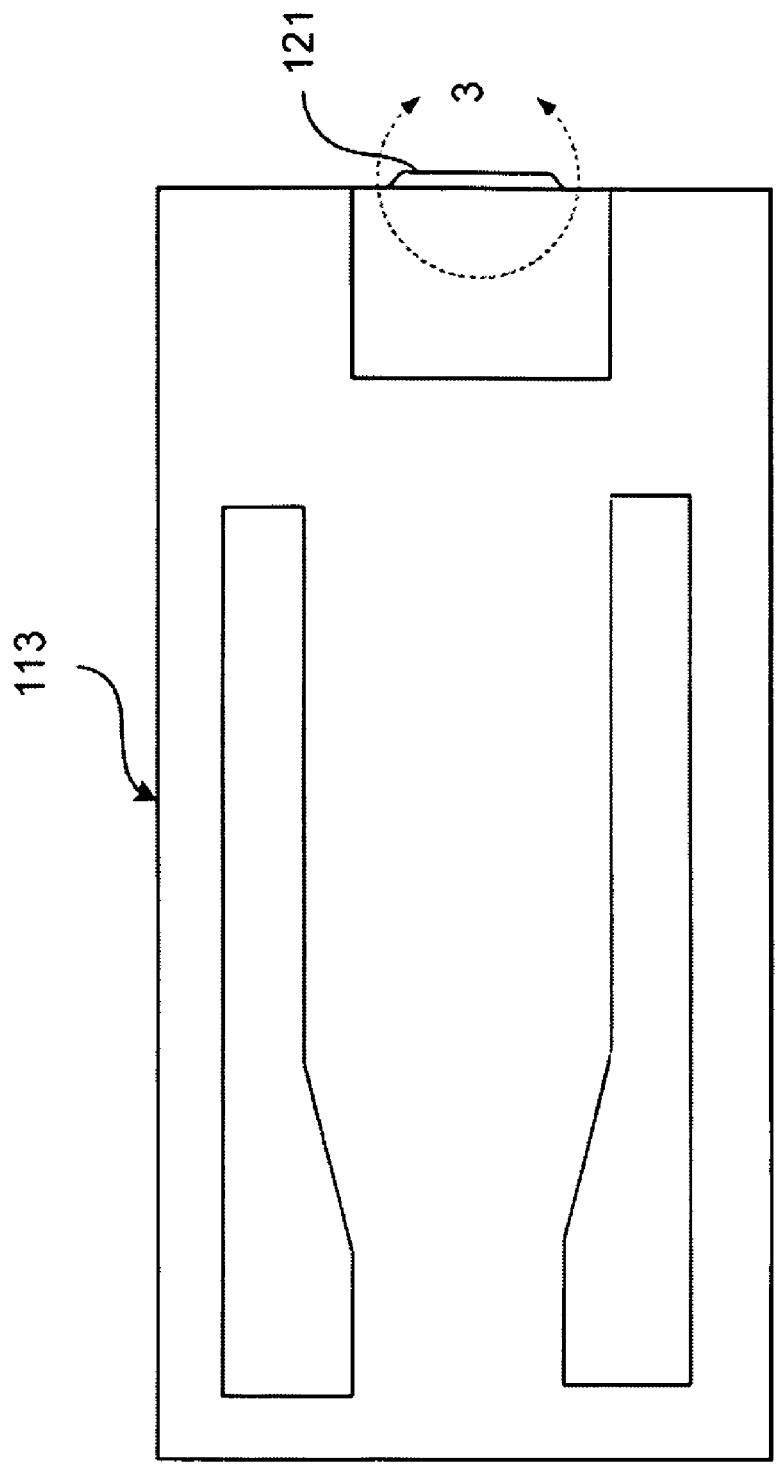
FIG. 2 is an ABS view of a slider illustrating the location of a read sensor thereon.
Figure 3:
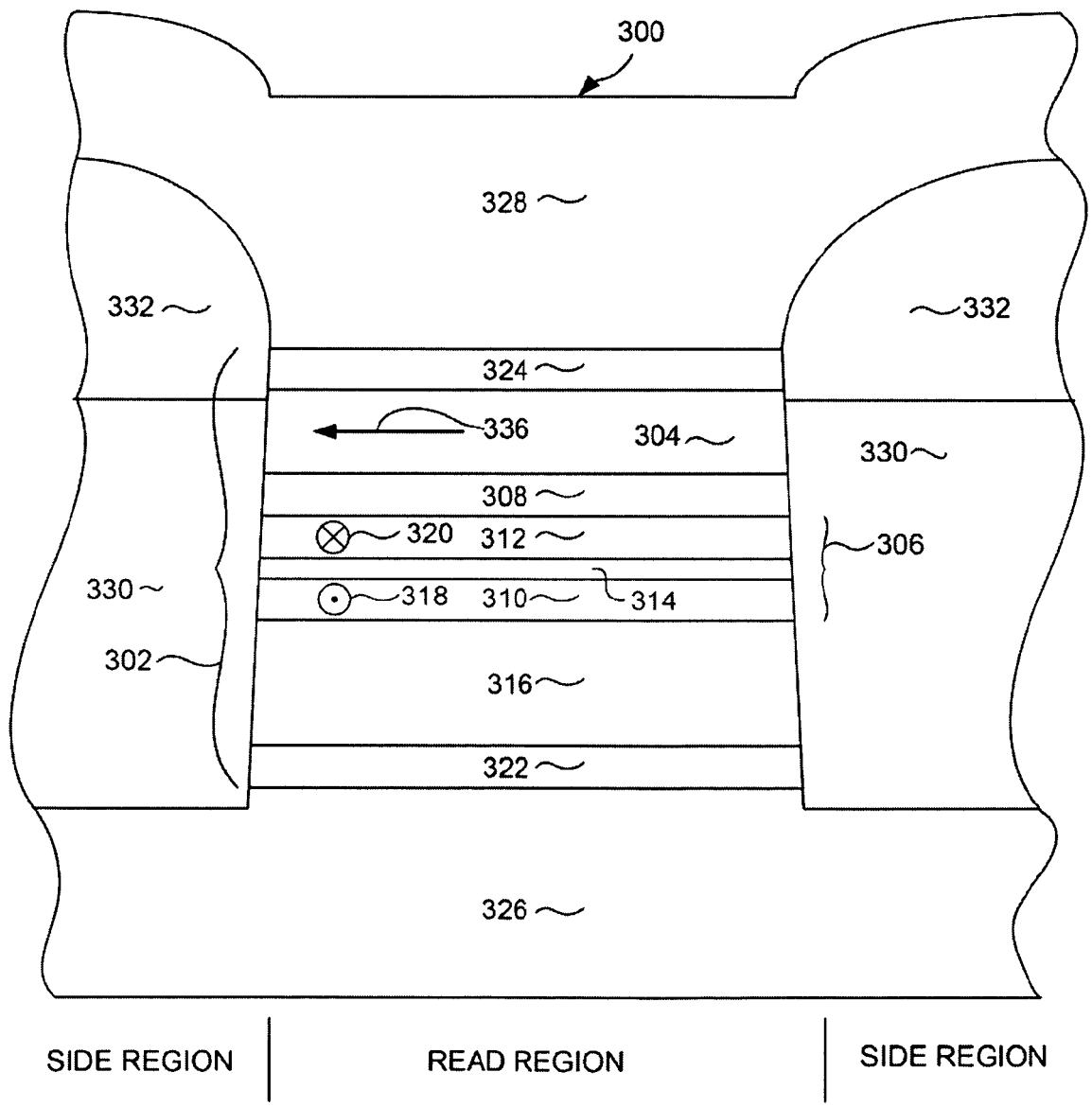
FIG. 3 is an ABS view of a prior-art read head commonly used in a current-in-plane (CIP) mode, wherein a GMR sensor is included.
Figure 4:
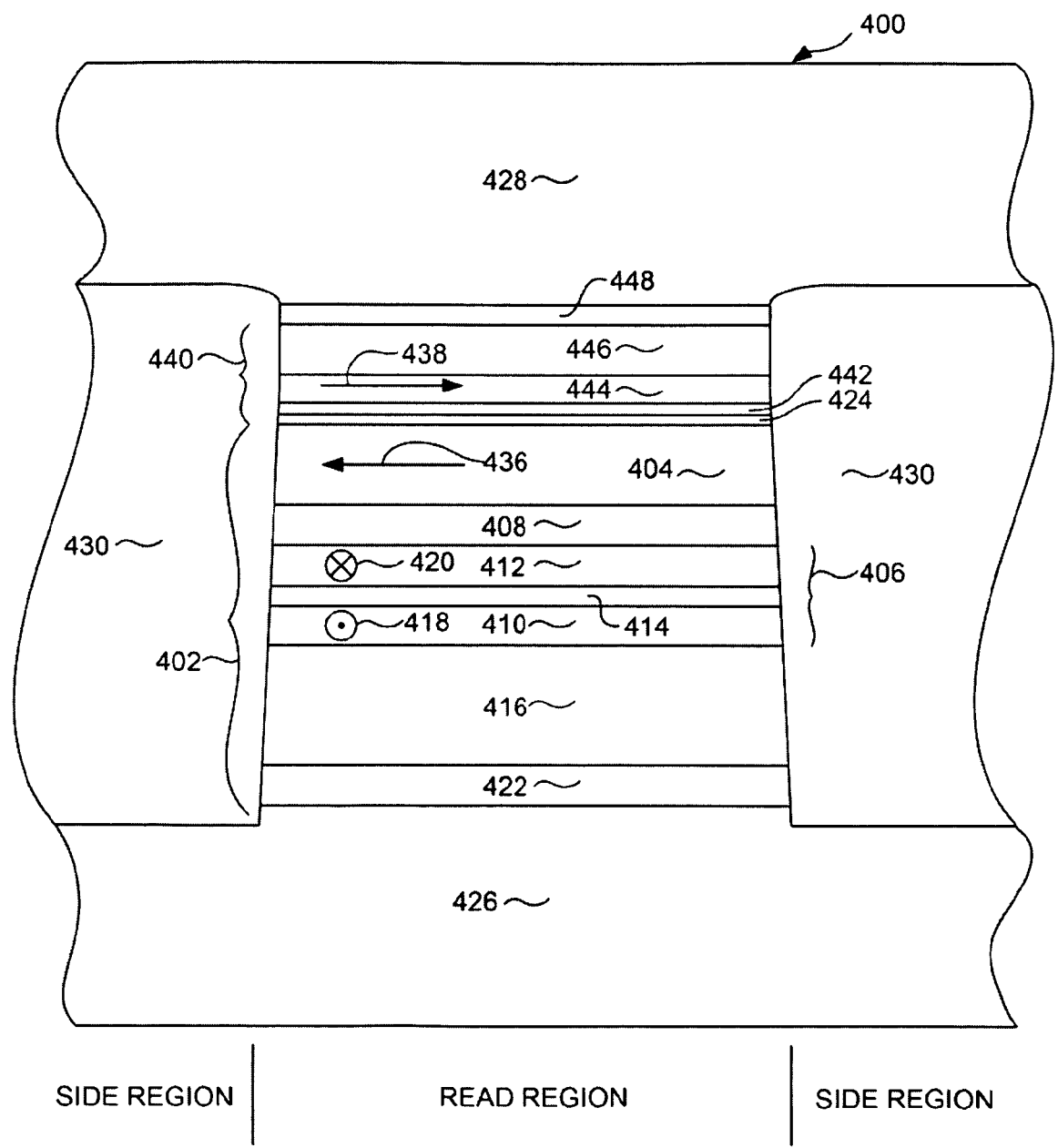
FIG. 4 is an ABS view of a prior-art read head recently used in a current-perpendicular-to-plane (CPP) mode, wherein a TMR sensor is included.
Figure 5:
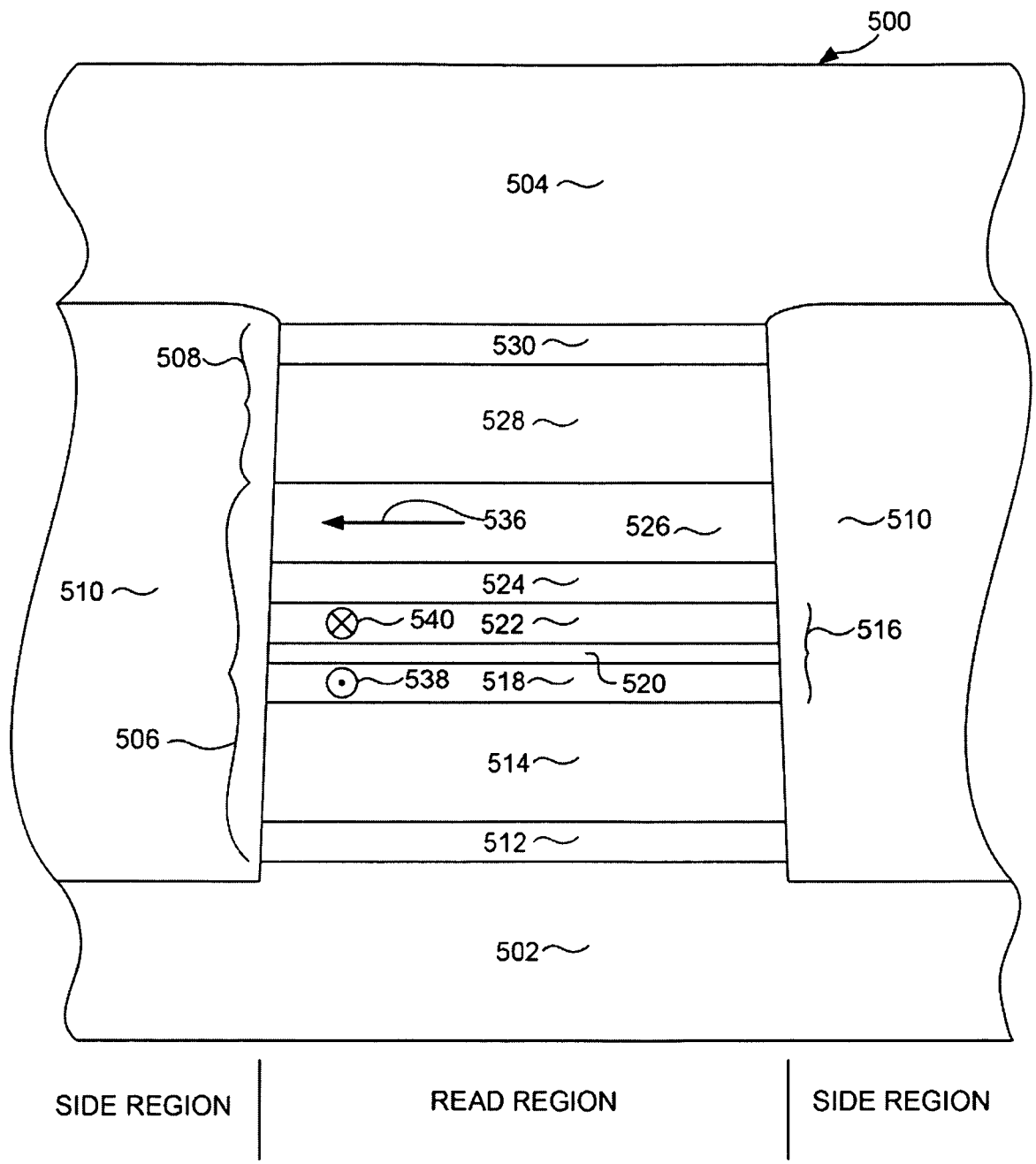
FIG. 5 is an ABS view of a read head according to an embodiment of this invention, wherein a bottom-type GMR sensor and a uniform LB stack are included.

With reference now to FIG. 5, a read head 500 according to an embodiment of this invention includes first and second magnetic-shield layers (not shown), first and second read-gap layers 502, 504, a bottom-type GMR sensor 506, a uniform LB stack 508, and conductor layers 510. The bottom-type GMR sensor 506, the uniform LB stack 508, and the conductor layers 510 are sandwiched between the first and second read-gap layers 502, 504, which are in turn sandwiched between the first and second magnetic-shield layers (not shown).

The bottom-type GMR sensor 506 includes Al—O/Ni—Cr—Fe/Ni—Fe seed layers 512, an antiferromagnetic Ir—Mn—Cr (or Ir—Mn or Pt—Mn) transverse pinning layer 514, a synthetic pinned-layer structure 516 (comprising a ferromagnetic Co—Fe first pinned layer 518 with a magnetization 538, a nonmagnetic Ru spacer layer 520, and a ferromagnetic Co—Fe second pinned layer 522 with a magnetization 540), a nonmagnetic conducting Cu—O spacer layer 524, and ferromagnetic Co—Fe/Ni—Fe sense layers 526 with a magnetization 536. The uniform LB stack 508 comprises an antiferromagnetic Ir—Mn—Cr (or Ir—Mn) longitudinal pinning layer 528 and a nonmagnetic Ta cap layer 530.

The Ir—Mn—Cr transverse pinning layer 514 "rigidly pins" the net magnetization of the synthetic pinned layer structure 516, thereby achieving proper sensor operation. On the other hand, the Ir—Mn—Cr longitudinal pinning layer 528 "optimally pins" the magnetization 536 of the Co—Fe/Ni—Fe sense layers 526, thereby not only overcoming strong the demagnetizing field within the sense layers 526, but also longitudinally biasing the sense layers 526. When receiving a signal field from a rotating magnetic disk, the magnetization 536 of the sense layers 526 is still free to rotate from the longitudinal direction, while the magnetizations 538, 540 of the synthetic pinned-layer structure 516 remain unchanged. This rotation changes the resistance of the GMR sensor 506 by $\pm\Delta R_G \sin\theta_1 - \Delta R_A \sin^2\theta_1$ where $\theta_1$ is a rotation angle.

Figure 6:
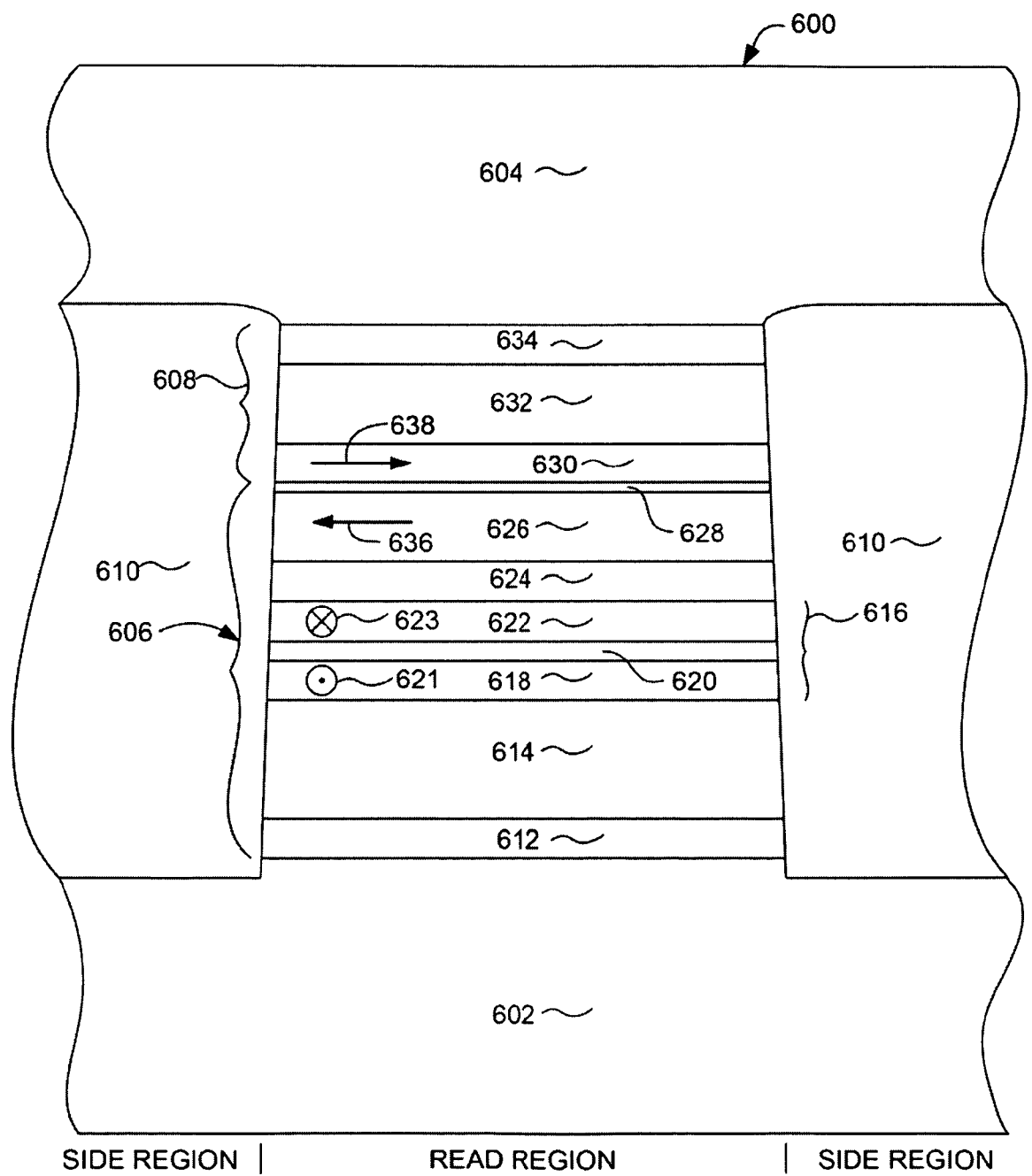
FIG. 6 is an ABS view of another read head according to an alternate embodiment of this invention, wherein a bottom-type GMR sensor and another uniform LB stack are included.

With reference to FIG. 6, a read head 600 according to an alternate embodiment of this invention includes first and second magnetic-shield layers (not shown), first and second read-gap layers 602, 604, a bottom-type GMR sensor 606, a uniform LB stack 608, and conductor layers 610. The bottom-type GMR sensor 606, the uniform LB stack 608, and the conductor layers 610 are sandwiched between the first and second read-gap layers 602, 604, which are in turn sandwiched between the first and second magnetic-shield layers (not shown).

The bottom-type GMR sensor 606 comprises Al—O/Ni—Cr—Fe/Ni—Fe seed layers 612, an antiferromagnetic Ir—Mn—Cr (or Ir—Mn or Pt—Mn) transverse pinning layer 614, a synthetic pinned-layer structure 616 (comprising a ferromagnetic Co—Fe first pinned layer 618 having a magnetization 621, a nonmagnetic Ru first spacer layer 620, and a ferromagnetic Co—Fe second pinned layer 622 having a magnetization 623), a nonmagnetic conducting Cu—O spacer layer 624, and ferromagnetic Co—Fe/Ni—Fe sense layers 626 having a magnetization 636. The uniform LB stack 608 comprises a nonmagnetic Ru second spacer layer 628, a ferromagnetic Ni—Fe (or Co—Fe) longitudinal pinned layer 630 having a magnetization 638, an antiferromagnetic Ir—Mn—Cr (or Ir—Mn) longitudinal pinning layer 632, and a nonmagnetic Ta cap layer 634.

The Ir—Mn—Cr transverse pinning layer 614 "rigidly pins" the net magnetization of the synthetic pinned layer structure 616, thereby achieving proper sensor operation. On the other hand, the Ir—Mn—Cr longitudinal pinning layer 632 "optimally pins" the net magnetization of the Co—Fe/Ni—Fe sense layers 626 and the Ni—Fe longitudinal pinned layers 630, thereby not only overcoming strong the demagnetizing field within the sense layers 626, but also longitudinally biasing the sense layers 626.

Figure 7:
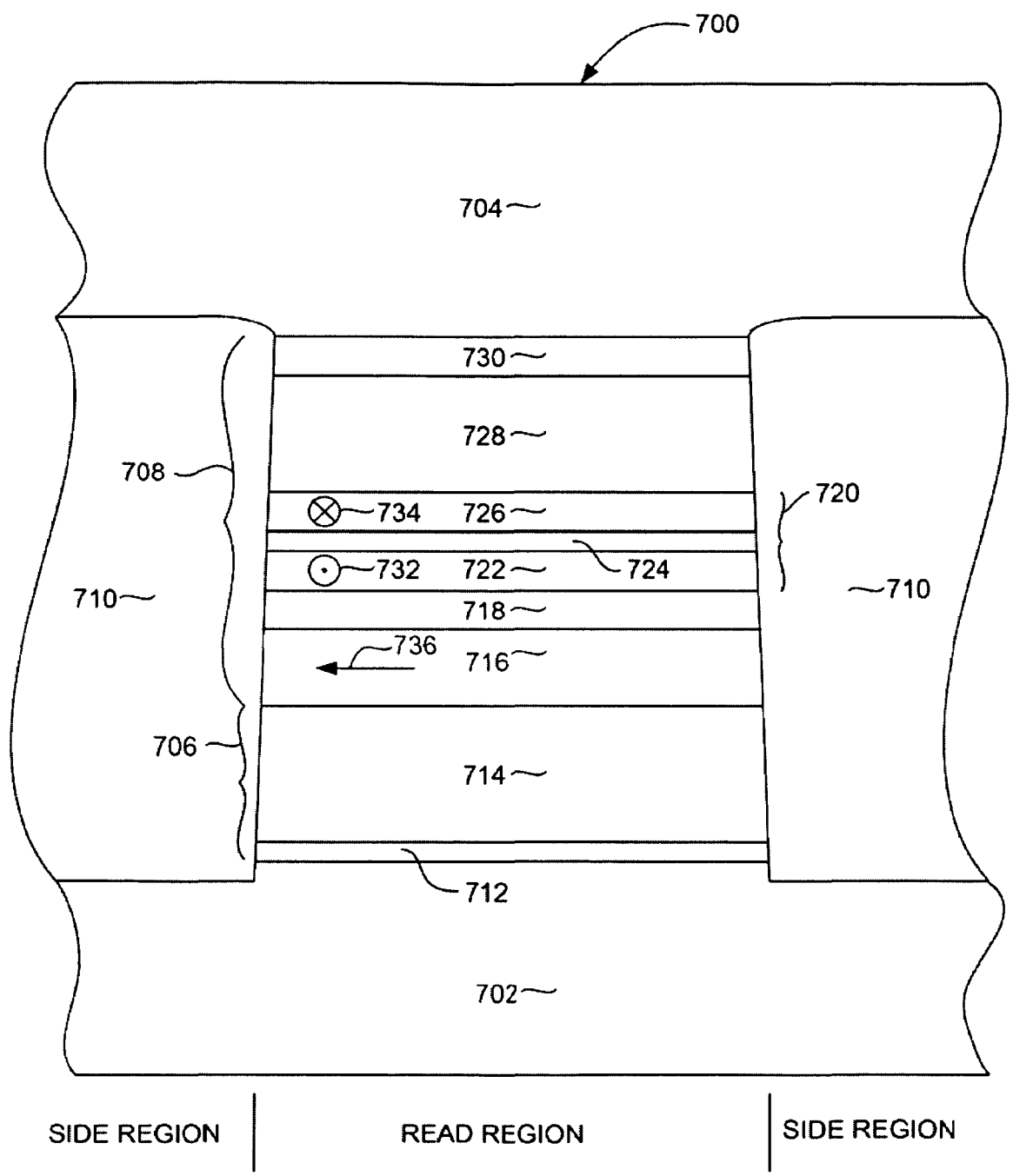
FIG. 7 is an ABS view of a yet another read head according to yet another embodiment of this invention, wherein a top-type GMR sensor and a uniform LB stack are included.

With reference now to FIG. 7, a read head 700 according to yet another embodiment of this invention includes first and second magnetic-shield layers (not shown), first and second read-gap layers 702, 704, a uniform LB stack 706, a top-type GMR sensor 708, and conductor layers 710. The uniform LB stack 706, the top-type GMR sensor 708, and the conductor layers 710 are sandwiched between the first and second read-gap layers 702, 704, which are in turn sandwiched between the first and second magnetic-shield layers (not shown).

The uniform LB stack 706 comprises Al—O/Ni—Cr—Fe/Ni—Fe seed layers 712 and an antiferromagnetic Ir—Mn—Cr (or Ir—Mn) longitudinal pinning layer 714. The top-type GMR sensor 708 comprises ferromagnetic Ni—Fe/Co—Fe sense layers 716 having a magnetization 736, a nonmagnetic conducting Cu—O spacer layer 718, a synthetic pinned-layers structure 720 (comprising a ferromagnetic Co—Fe first pinned layer 722 having a magnetization 732, a nonmagnetic Ru spacer layer 724, and a ferromagnetic Co—Fe second pinned layer 726 having a magnetization 734), an antiferromagnetic Ir—Mn—Cr (or Ir—Mn or Pt—Mn) transverse pinning layer 728, and a nonmagnetic Ta cap layer 730.

Figure 8:
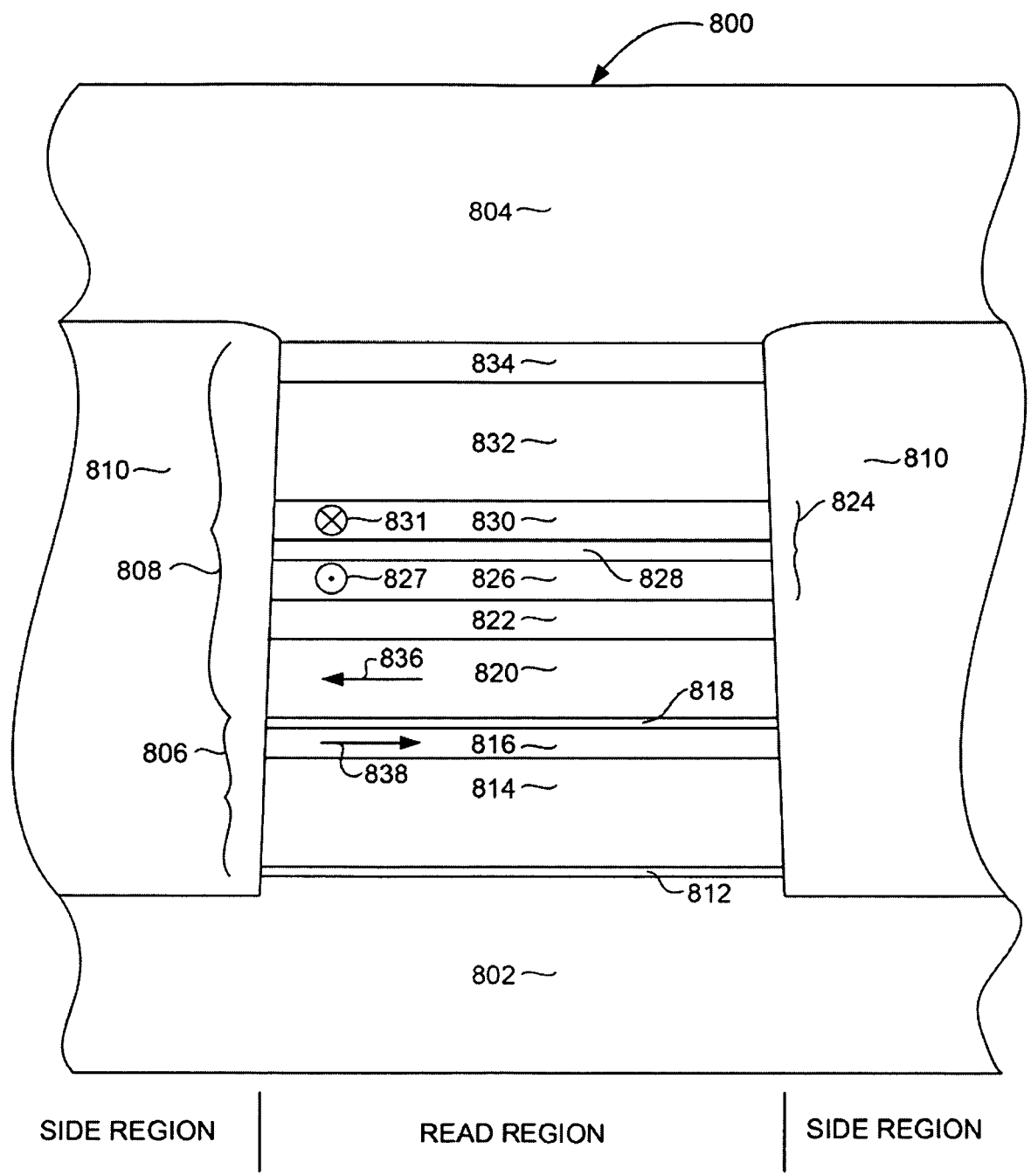
FIG. 8 is an ABS view of a yet another read head according to yet another embodiment of this invention, wherein a top-type GMR sensor and another uniform LB stack are included.

With reference now to FIG. 8, a read head 800 according to still another embodiment of this invention includes first and second magnetic-shield layers (not shown), first and second read-gap layers 802, 804, a uniform LB stack 806, a top-type GMR sensor 808, and conductor layers 810. The uniform LB stack 806, the top-type GMR sensor 808, and the conductor layers 810 are sandwiched between the first and second read-gap layers 802, 804, which are in turn sandwiched between the first and second magnetic-shield layers (not shown).

The uniform LB stack 806 comprises Al—O/Ni—Cr—Fe/Ni—Fe seed layers 812, an antiferromagnetic Ir—Mn—Cr (or Ir—Mn) longitudinal pinning layer 814, a ferromagnetic Ni—Fe (or Co—Fe) longitudinal pinned layer 816 having a magnetization 838, and a nonmagnetic Ru first spacer layer 818. The top-type GMR sensor 808 comprises ferromagnetic Ni—Fe/Co—Fe sense layers 820 having a magnetization 836, a nonmagnetic conducting Cu—O spacer layer 822, a synthetic pinned-layer stricture 824 (comprising a ferromagnetic Co—Fe first pinned layer 826 having a magnetization 827, a nonmagnetic second Ru spacer layer 828, and a ferromagnetic Co—Fe second pinned layer 830 having a magnetization 831), an antiferromagnetic Ir—Mn—Cr (or Ir—Mn or Pt—Mn) transverse pinning layer 832, and a nonmagnetic Ta cap layer 834.

The fabrication process of these four types of GMR sensors as shown in FIGS. 5, 6, 7 and 8, will be described below. The top-type GMR sensor 700 as shown in FIG. 7 will be used for the description. The uniform LB stack 706 and the top-type GMR sensor 708 are sequentially deposited in a deposition field of about 100 Oe on a 5.5 nm thick $Al_2O_3$ first read-gap layer 702. The longitudinal LB stack 706 comprise Al—O (3)/Ni—Cr—Fe(3)/Ni—Fe(0.4)/Ir—Mn—Cr(5) films (thickness in nm). The top-type GMR sensor 708 comprises Ni—Fe(2.4)/Co—Fe(1)/Cu—O(1.8)/Co—Fe(1.6)/Ru(0.8)/Co—Fe(1.6)/Ir—Mn—Cr(5)/Ta(4) films. A transverse-field anneal is applied in a field of 50,000 Oe for 5 hours at 240° C. in a direction perpendicular to the deposition field. A longitudinal-field anneal is then applied in a field of about 200 Oe for 2 hours at 240° C. in a direction parallel to the deposition field. A monolayer photoresist is applied and patterned in a photolithographic tool to mask the uniform LB stack 706 and the top-type GMR sensor 708 in a read region. Ion milling is then applied to entirely remove the uniform LB stack 706 and the top-type GMR sensor 708, and partially remove the $Al_2O_3$ first read-gap layer 702 in two exposed side regions. However, a partial ion milling process wherein the LB stack 706 is not entirely removed may also be employed. Conductor layers 710 comprising Cr(3)/Rh(75) films are then deposited into the two exposed side regions. The monolayer photoresist is lifted off, with assistance of CMP. In a subsequent similar patterning process, recessed conductor layers (not shown) comprising Ta(10)/Cu(60)/Ta(10) films are deposited. After a monolayer photoresist is lifted off, a 5.5 nm thick $Al_2O_3$ second read-gap layer 704 is then deposited.

The top-type GMR sensor 700 requires the transverse-field anneal to establish strong ferromagnetic/antiferromagnetic coupling between the synthetic pinned-layer structure 720 and the Ir—Mn—Cr transverse pinning layer 728. The anneal field must exceed the saturation field ($H_S$) of antiparallel ferromagnetic/ferromagnetic coupling across the Ru second spacer layer 724 (~8,000 Oe) for aligning the magnetization 732 of the Co—Fe first pinned layer 722 and the magnetization 734 of the Co—Fe second pinned layer 726 in the transverse direction. After cooling to room temperature, the magnetization 734 of the Co—Fe second pinned layer 726 is rigidly pinned by the Ir—Mn—Cr transverse pinning layer 728 in the transverse direction, while the magnetization 732 of the Co—Fe first pinned layer 722 is rotated by 180°. A transverse flux closure will be formed between the magnetizations 732, 734 after patterning, resulting in a small net magnetization in the Co—Fe/Ru/Co—Fe synthetic pinned-layer structure 720. This small magnetization induces a small demagnetizing field ($H_D$) in the Ni—Fe/Co—Fe sense layers 716.

The uniform LB stack 706 requires the longitudinal-field anneal to establish medium antiferromagnetic/ferromagnetic coupling between the Ir—Mn—Cr longitudinal pinning layer 714 and the sense layer 716. The anneal field only needs to exceed the unidirectional anisotropy field ($H_{UA}$) at 240° C. of the Ir—Mn—Cr longitudinal pinning layer 714 and the sense layer 716 (below 100 Oe) for aligning the magnetization 736 of the sense layer 716 in the longitudinal direction. After cooling to room temperature, the magnetization 736 of the sense layer 716 is "optimally pinned" by the Ir—Mn—Cr longitudinal pinning layer 714 in the longitudinal direction. A uniform longitudinal bias field, equivalent to the difference between the $H_{UA}$ and the demagnetizing field, is produced for the stabilization of the sense layers 716. Since this anneal field is much lower than the spin-flop field ($H_{SF}$) of antiparallel ferromagnetic/ferromagnetic coupling across the Ru spacer layer 724 at 240° C. (1,000 Oe), the transverse flux closure between the magnetizations 732, 734 is not interrupted.

In this top-type GMR sensor 708 overlying the uniform LB stack 706, ferromagnetic/antiferromagnetic coupling occurs between the Co—Fe/Ru/Co—Fe synthetic pinned-layer structure 720 and the Ir—Mn—Cr transverse pinning layer 728, producing a transverse pinning field ($H_P$). This $H_P$ must be high enough to rigidly pin the net magnetization of the Co—Fe/Ru/Co—Fe synthetic pinned-layer structure 720 in the transverse direction for proper sensor operation. Ferromagnetic/ferromagnetic coupling also occurs across the Cu—O spacer layer 718, producing a negative ferromagnetic coupling field ($H_F$). This $H_F$ must be precisely controlled so that the sum of $H_F$ and $H_D$ counterbalances a current-induced field ($H_I$) in the sense layers 716 ($H_F+H_D=H_I$), thereby orienting the magnetization 736 of the sense layers 716 in the longitudinal direction for optimally biased sensor operation. In a quiescent position, this GMR sensor exhibits a resistance of $R_o+\Delta R_A+(\frac{1}{2})\Delta R_G$, where $R_o$ is a nonmagnetic resistance, $R_A$ is the maximum anisotropy magnetoresistance (AMR) of the sense layers 716, and $R_G$ is the maximum giant magnetoresistance (GMR) resistance. When receiving a signal field from a rotating magnetic disk, the magnetization 736 of the sense layers 716 is still free to rotate from the longitudinal direction, while the magnetizations 732, 734 of the synthetic pinned layer structure 720 remain unchanged. This rotation changes the resistance of the GMR sensor 708 by $\pm\Delta R_G \sin\theta_1 - \Delta R_A \sin^2\theta_1$, where $\theta_1$ is a rotation angle.

To ensure the viability of this invention, it is necessary to attain an optimal $H_{UA}$ for stabilizing the sense layers 716. This $H_{UA}$ must be high enough to not only overcome the demagnetizing field within the sense layers 716, but also longitudinally bias the sense layers 716. This $H_{UA}$ must also be low enough to minimize a loss in signal sensitivity. Modeling indicates that, the optimal $H_{UA}$ substantially increases when miniaturizing the top-type GMR sensor 708 for magnetic recording at ever increasing densities. For example, for a top-type GMR sensor with 40 nm in width and 40 nm in height, the sense layers 716 with a magnetic moment of 0.24 memu/cm$^2$ (equivalent to that of a 3 nm thick Ni—Fe sense layer) require an $H_{UA}$ of 250 Oe to stabilize the sense layers 716 while maintaining reasonably high signal sensitivity. This modeling result is quite unexpected since the required $H_{UA}$ was speculated to range from 20 to 40 Oe for a prior-art large top-type GMR sensor having a low demagnetizing field with the sense layers. As the sensor height and width further decrease for magnetic recording at ever increasing densities, the needed $H_{UA}$ is predicted to be as high as 500 Oe. This optimal $H_{UA}$ is attained by utilizing the Al—O/Ni—Cr—Fe/Ni—Fe seed and Ir—Mn—Cr pinning layers with optimal thicknesses and compositions, as described below.

Figure 9:
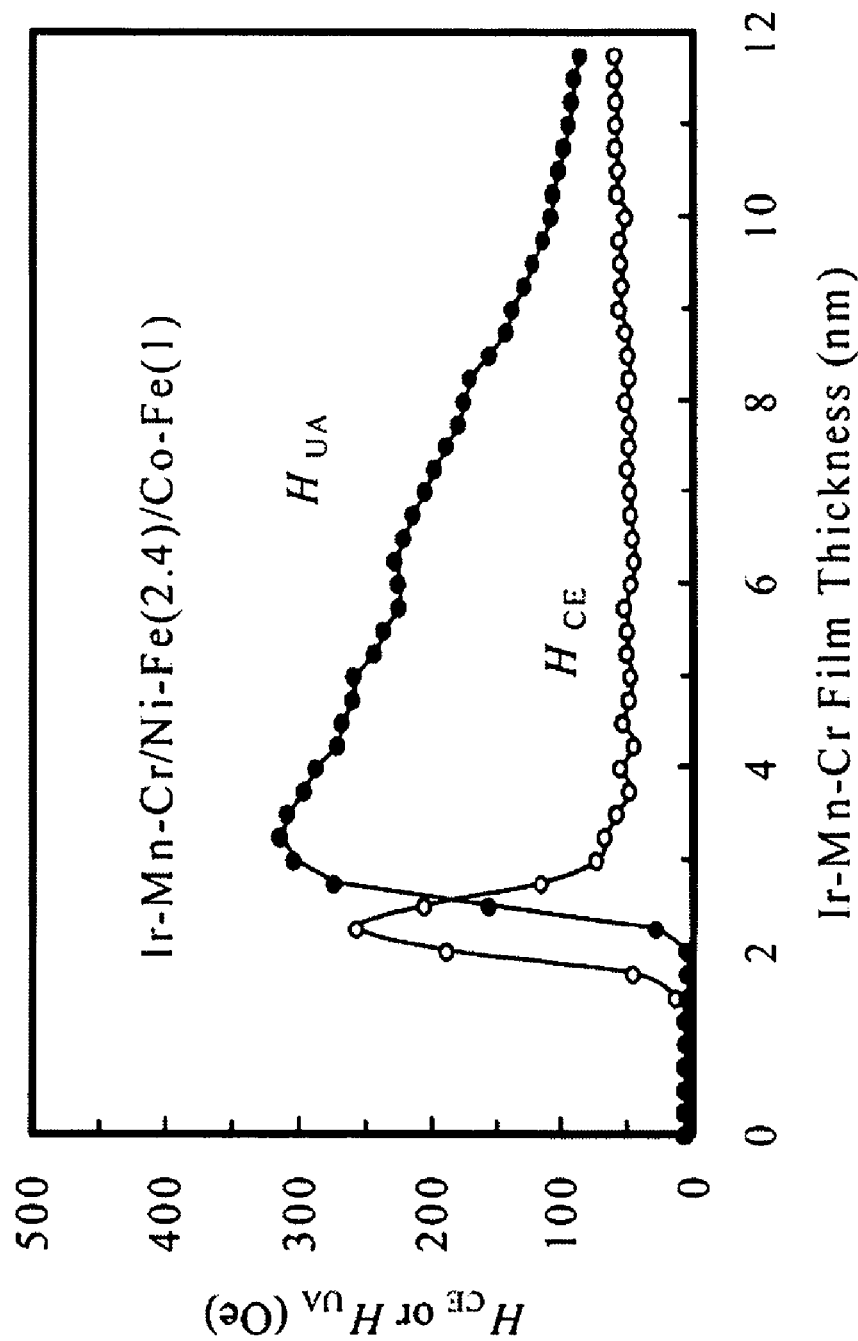
FIG. 9 is a plot showing the easy-axis coercivity ($H_{CE}$) and the unidirectional anisotropy field ($H_{UA}$) versus the Ir—Mn—Cr film thickness for Al—O(3)/Ni—Cr—Fe(3)/Ni—Fe(0.4)/Ir—Mn—Cr/Ni—Fe(2.4)/Co—Fe(1)/Cu—O(2.4)/Ta(4) films (thickness in nm)

FIG. 9 shows the easy-axis coercivity ($H_{CE}$) and the unidirectional anisotropy field ($H_{UA}$) versus the Ir—Mn—Cr film thickness for Al—O(3)/Ni—Cr—Fe(3)/Ni—Fe(0.4)/Ir—Mn—Cr/Ni—Fe(2.4)/Co—Fe(1)/Cu—O(2.4)/Ta(4) films (thickness in nm). Without the Al—O, Ni—Cr—Fe and Ni—Fe seed layers, $H_{CE}$ is below 10 Oe while $H_{UA}$ is nearly zero (not shown) over a wide Ir—Mn—Cr thickness range. With these three seed layers having optimal thicknesses and compositions, the polycrystalline grains of the Ir—Mn—Cr longitudinal pinning layer and the Ni—Fe/Co—Fe sense layers become substantially large, thus substantially increasing both $H_{CE}$ and $H_{UA}$. The Ir—Mn—Cr longitudinal pinning layer must be thicker than 3 nm to attain a reasonably low $H_{CE}$ and a high $H_{UA}$. Its thickness is selected based on the modeling of a read sensor with designed geometries for determining a needed $H_{UA}$. For example, a 5 nm thick Ir—Mn—Cr longitudinal pinning layer is selected for the uniform LB stack, in order to attain an $H_{UA}$ of 250 Oe for a read sensor with 40 nm in width and 40 nm in height. Since $H_{UA}$ is inversely proportional to the magnetic moment, a 5 nm thick Ir—Mn—Cr transverse pinning layer can also be selected for the read sensor, and the $H_{UA}$ can be infinite after zeroing the net magnetic moment of the synthetic pinned-layer structure. Hence, with the same Ir—Mn—Cr films used as the longitudinal and transverse pinning layers, the sense layers can be "optimally" pinned" while the synthetic pinned-layer structure can be "rigidly pinned".

Figure 10:
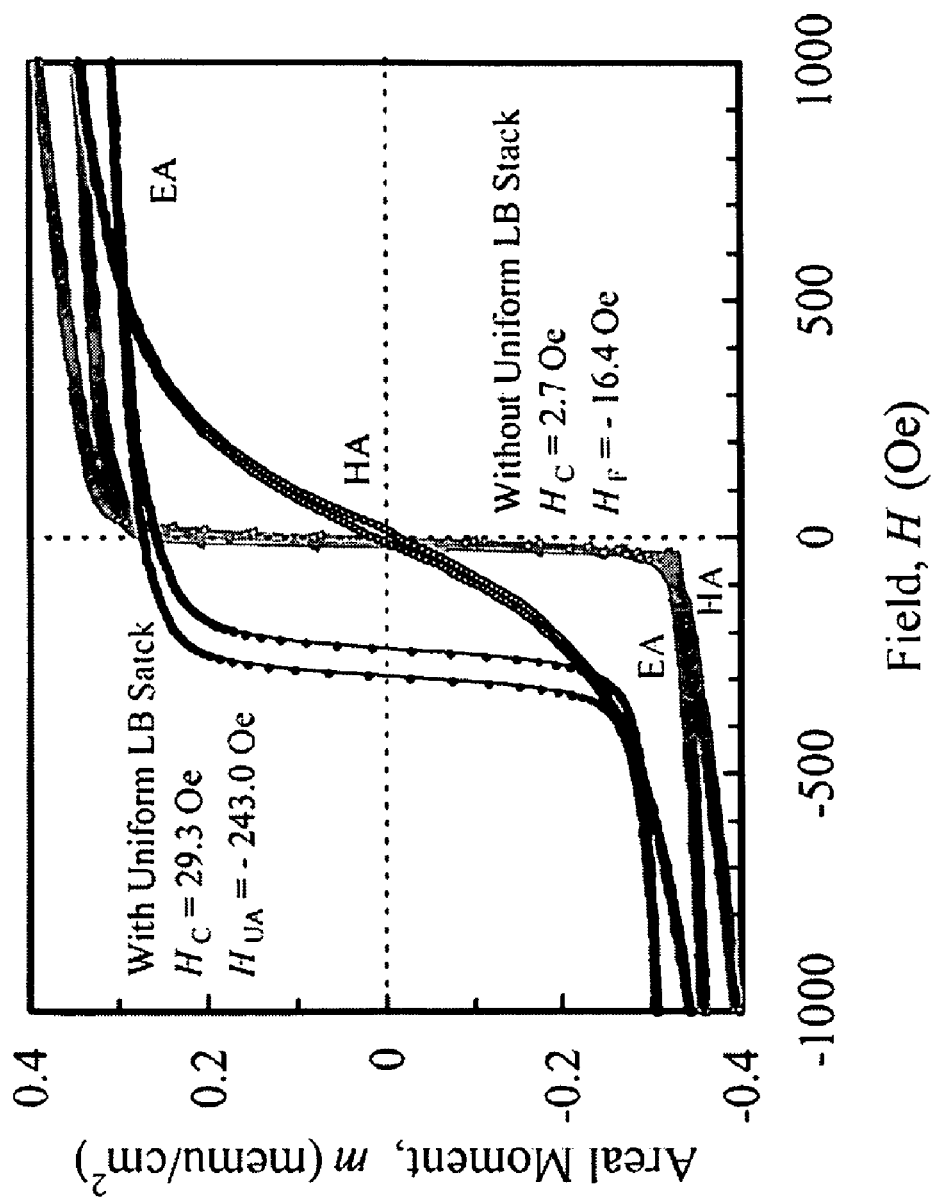
FIG. 10 is a plot showing easy-axis and hard-axis hysteresis loops of magnetic moment (m) versus field (H) for a top-type GMR sensor, comprising Al—O(3)/Ni—Cr—Fe(3)/Ni—Fe(1.6)/Co—Fe(1)/Cu—O(1.8)/Co—Fe(1.6)/Ru(0.8)/Co—Fe(1.6)/Ir—Mn—Cr(5)/Ta(4), and a top-type GMR sensor overlying a uniform LB stack, comprising Al—O(3)/Ni—Cr—Fe(3)/Ni—Fe(0.4)/Ir—Mn—Cr(5)/Ni—Fe(2.4)/Co—Fe(1)/Cu—O(1.8)/Co—Fe(1.6)/Ru(0.8)/Co—Fe(1.6)/Ir—Mn—Cr(5)/Ta(4) films.

FIG. 10 shows easy-axis and hard-axis hysteresis loops of magnetic moment (m) versus field (H) for a top-type GMR sensor, comprising Al—O(3)/Ni—Cr—Fe(3)/Ni—Fe(1.6)/Co—Fe(1)/Cu—O(1.8)/Co—Fe(1.6)/Ru(0.8)/Co—Fe(1.6)/Ir—Mn—Cr(5)/Ta(4), and for a top-type GMR sensor overlying an LB stack, comprising Al—O(3)/Ni—Cr—Fe(3)/Ni—Fe(0.4)/Ir—Mn—Cr(5)/Ni—Fe(2.4)/Co—Fe(1)/Cu—O(1.8)/Co—Fe(1.6)/Ru(0.8)/Co—Fe(1.6)/Ir—Mn—Cr(5)/Ta(4) films. Without the uniform LB stack, the top-type GMR sensor shows good sense-layer properties such as $H_C$=2.7 Oe and $H_F$=−16.4 Oe. With the uniform LB stack, the top-type GMR sensor shows sense-layers properties such as $H_C$=29.3 Oe and $H_{UA}$=(259.4−16.4)=243.0 Oe. As predicted by modeling, such a high $H_{UA}$ is needed to not only overcome the demagnetizing field in the sense layers, but also longitudinally bias the sense layers. It should be noted that, in spite of the sense layer's high coercivity, the hard-axis hysteresis loop is nearly closed, indicating that transfer curve attained during sensor operation can be nearly closed.

Figure 11:
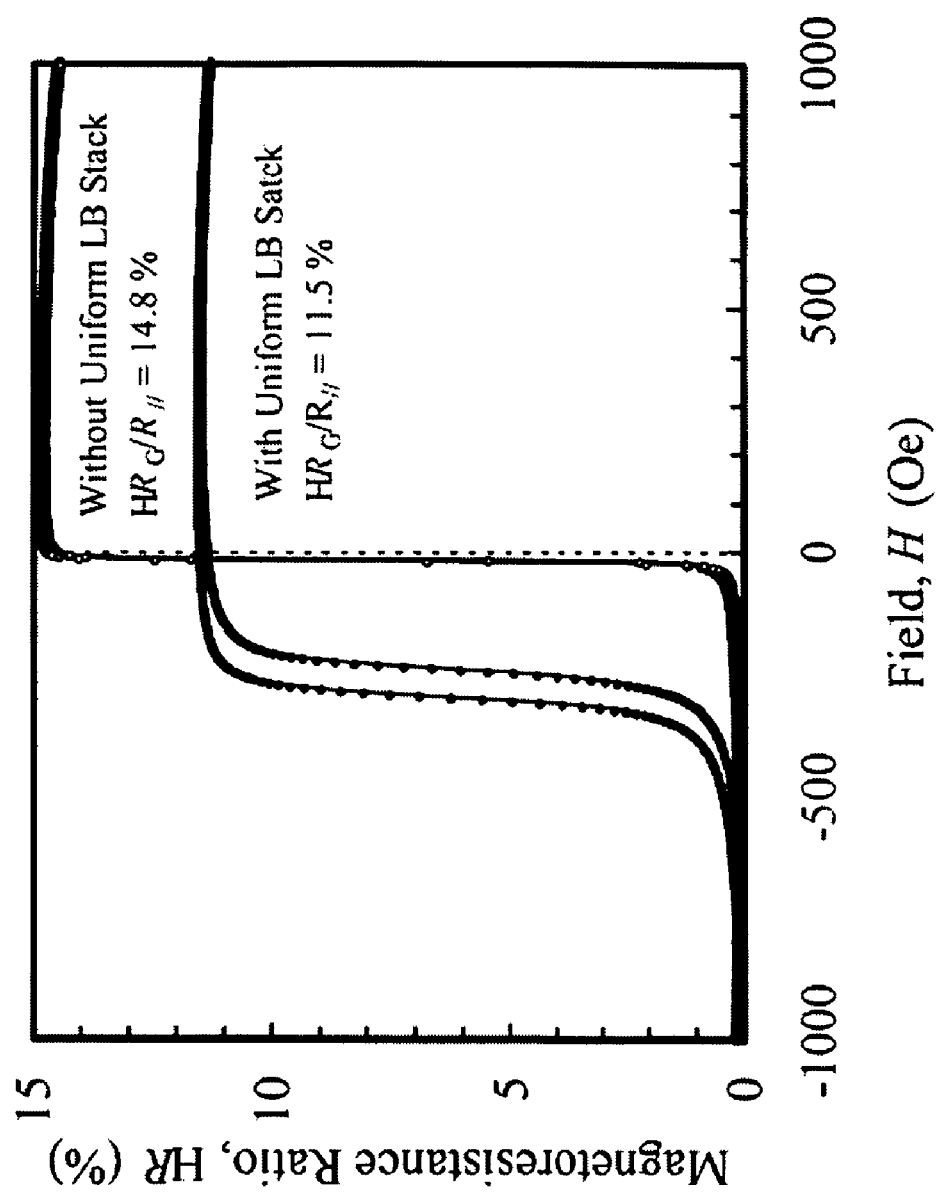
FIG. 11 is a plot showing the easy-axis loops of magnetoresistance (R) versus field (H) for a top-type GMR sensor, comprising Al—O(3)/Ni—Cr—Fe(3)/Ni—Fe(1.6)/Co—Fe(1)/Cu—O(1.8)/Co—Fe(1.6)/Ru(0.8)/Co—Fe(1.6)/Ir—Mn—Cr(5)/Ta(4), and a top-type GMR sensor overlying a uniform LB stack, comprising Al—O(3)/Ni—Cr—Fe(3)/Ni—Fe(0.4)/Ir—Mn—Cr(5)/Ni—Fe(2.4)/Co—Fe(1)/Cu—O(1.8)/Co—Fe(1.6)/Ru(0.8)/Co—Fe(1.6)/Ir—Mn—Cr(5)/Ta(4) films.

FIG. 11 shows the easy-axis loops of magnetoresistance (R) versus field (H) for a top-type GMR sensor, comprising Al—O(3)/Ni—Cr—Fe(3)/Ni—Fe(1.6)/Co—Fe(1)/Cu—O(1.8)/Co—Fe(1.6)/Ru(0.8)/Co—Fe(1.6)/Ir—Mn—Cr(5)/Ta(4), and for a top-type GMR sensor overlying an LB stack, comprising Al—O(3)/Ni—Cr—Fe(3)/Ni—Fe(0.4)/Ir—Mn—Cr(5)/Ni—Fe(2.4)/Co—Fe(1)/Cu—O(1.8)/Co—Fe(1.6)/Ru(0.8)/Co—Fe(1.6)/Ir—Mn—Cr(5)/Ta(4) films. Due to current shunting caused by the uniform LB stack, the GMR coefficient of the top-type GMR sensor decreases from 14.8% to 11.5%.

As expected, the use of the uniform LB stack 706 for the top-type GMR sensor 708 causes degradation of sense-layer and GMR properties. It should be noted that, however, once the top-type GMR sensor 708 overlying the uniform LB stack 706 is implemented into a sensor environment, several emerging advantages will compensate for the disadvantages. First, without the use of decoupling layers between the longitudinal pinning layer 714 and the sense layers 716, the unidirectional anisotropy field ($H_{UA}$) needed for the longitudinal bias can be much lower than that used in the prior art. As a result, it becomes much easier to find a suitable antiferromagnetic film for the use as the longitudinal pinning layer 714. Second, the longitudinal bias field becomes uniform, instead of being very non-uniform in the prior-art hard-magnetic and antiferromagnetic stabilization schemes, so that the sense layers 716 can be completely stabilized. Third, the sensor width can be precisely controlled since an uncertainty in defining the sensor width, due to complicated magnetics at sensor edges between the read and side regions, is eliminated.

Fourth, in spite of lower signal sensitivity, signal fields can be sensed effectively by the entire read sensor. In contrast, in the prior art, no signal fields can be sensed from two sensor edges due to sense-layer stiffness at sensor edges, while signal fields with noises can be sensed from the center of the read sensor due to sense-layer instability in the center of the read sensor. Fifth, since only the conductor layers, instead of longitudinal bias and conductor layers used in the prior art, are deposited into the two exposed side regions, overhangs on the monolayer photoresist are much thinner and thus only a milder CMP is needed. As a result, there will be less concerns on losses in signal amplitudes and on signal noises due to mechanical and magnetic damages caused by the CMP.

Figure 12:
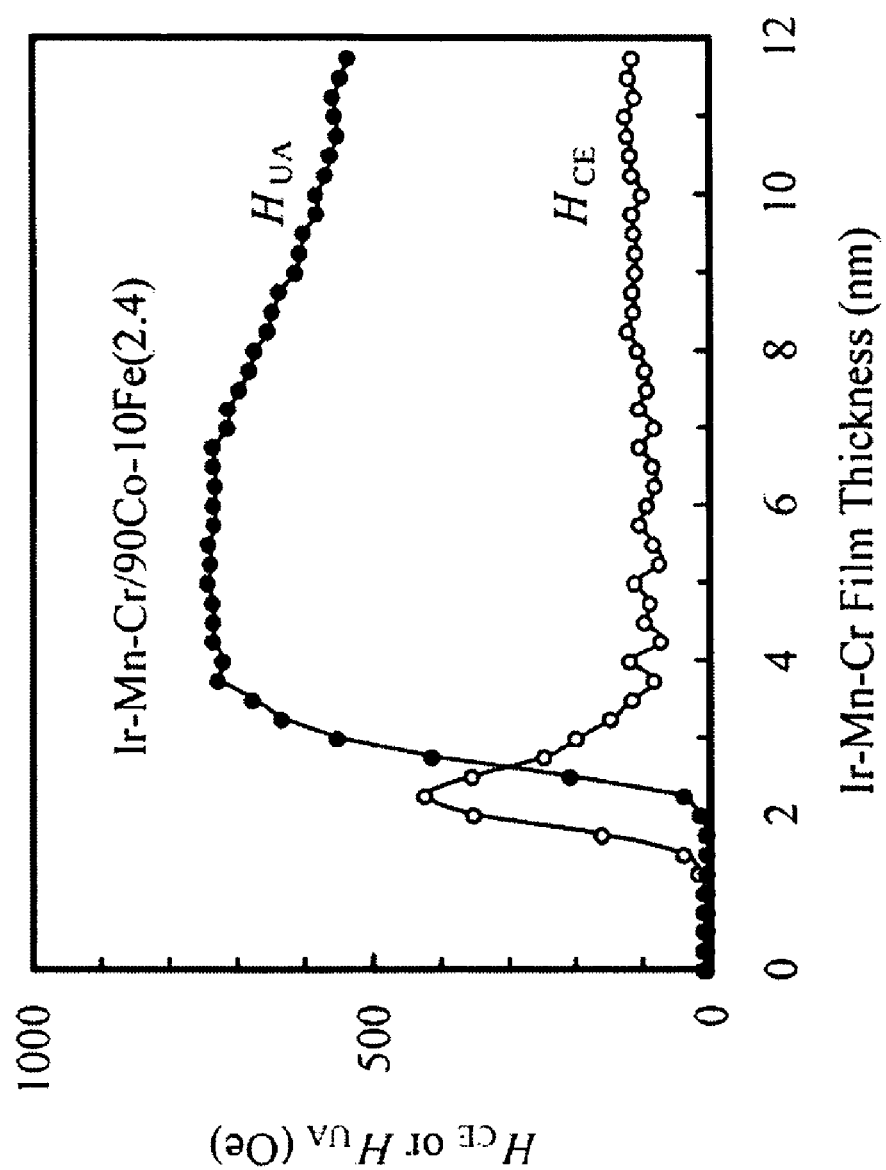
FIG. 12 is a plot showing $H_{CE}$ and $H_{UA}$ versus the Ir—Mn—Cr film thickness for Al—O(3)/Ni—Cr—Fe(3)/Ni—Fe(0.4)/Ir—Mn—Cr/90Co-10Fe(2.4)/Cu(2.4)/Ta(4) films.

To use the ever smaller read sensor for magnetic recording at ever increasing densities, the suppression of signal noises has been considered more stringent than the increase in signal amplitudes. An ever increasing demagnetizing field in the read sensor must be overcome before stabilizing the sense layers. Hence, when the read-sensor miniaturization technology continues. the read sensor with the uniform LB stack according to this invention is expected to be more viable than the read sensor used in the prior art Furthermore, modeling even indicates that, in order to reduce magnetic noises for a higher signal-to-noise ratio, the required $H_{UA}$ for a read sensor with below 40 nm in width and below 40 nm in height need to exceed 1,000 Oe. To attain such an unexpected high $H_{UA}$, a ferromagnetic Co—Fe film need to be sandwiched between the Ir—Mn—Cr longitudinal pinning layer 714 and the Ni—Fe/Co—Fe sense layers 716. FIG. 12 shows $H_{CE}$ and $H_{UA}$ versus the Ir—Mn—Cr film thickness for Al—O(3)/Ni—Cr—Fe(3)/Ni—Fe(0.4)/Ir—Mn—Cr/90Co-10Fe(2.4)/Cu(2.4)/Ta(4) films. The $H_{UA}$ can reach as high as 650 Oe.

Figure 13:
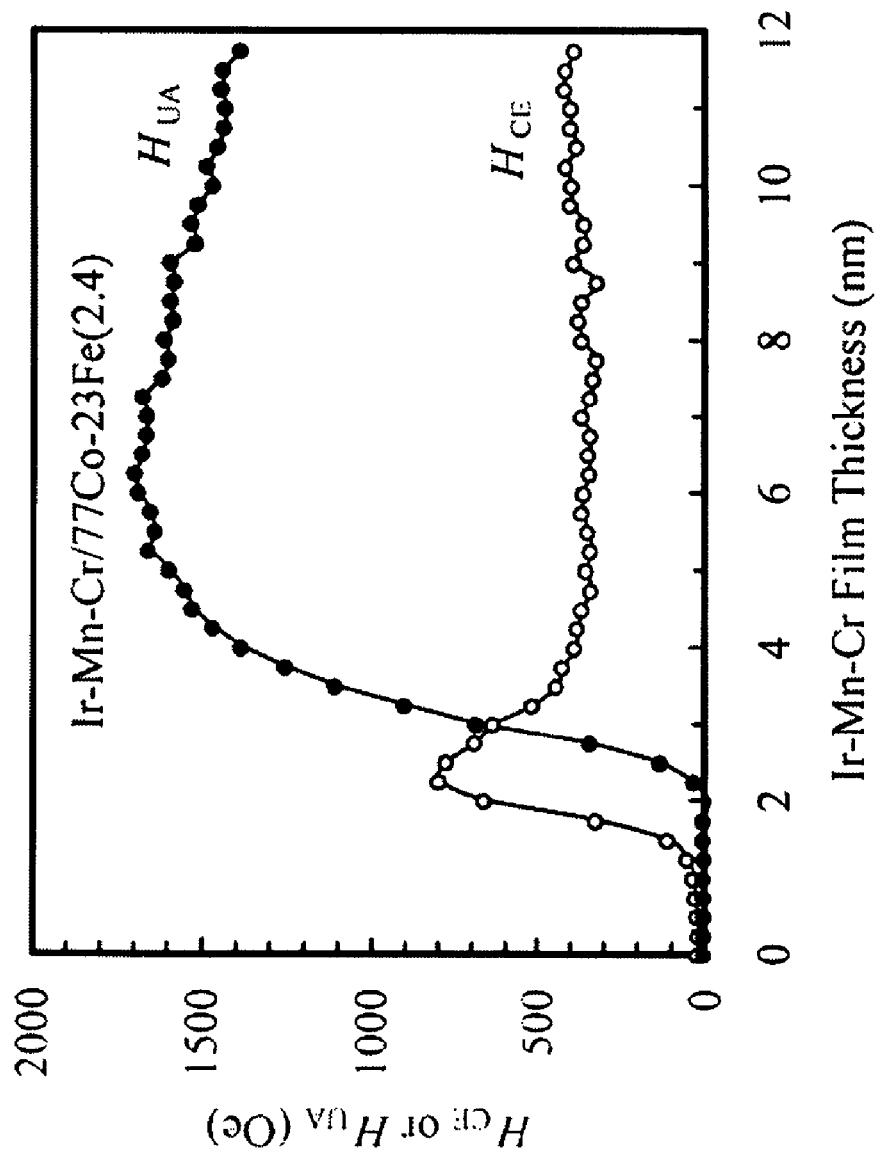
FIG. 13 is a plot showing $H_{CE}$ and $H_{UA}$ versus the Ir—Mn—Cr film thickness for Al—O(3)/Ni—Cr—Fe(3)/Ni—Fe(0.4)/Ir—Mn—Cr/77Co-23Fe(2.4)/Cu(2.4)/Ta(4) films.

In addition, the Fe content of the Co—Fe film can be varied for an even higher $H_{UA}$. FIG. 13 shows $H_{CE}$ and $H_{UA}$ versus the Ir—Mn—Cr film thickness for Al—O(3)/Ni—Cr—Fe(3)/Ni—Fe(0.4)/Ir—Mn—Cr/77Co-23Fe(2.4)Cu(2.4)/Ta(4) films (thickness in nm). The $H_{UA}$ can reach as high as 1,700 Oe.

Figure 14:
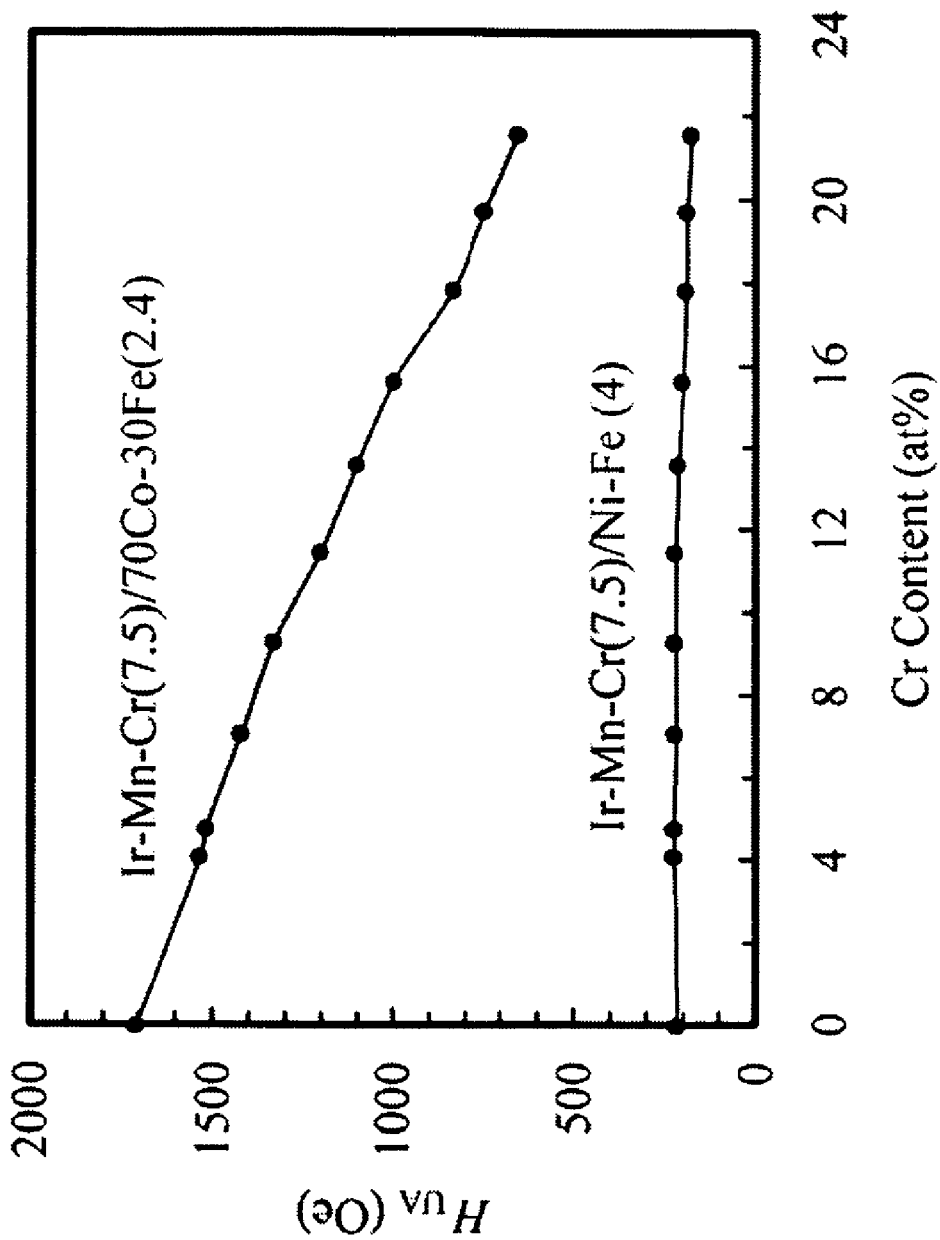
FIG. 14 is a plot showing $H_{CE}$ and $H_{UA}$ versus the Cr content of the Ir—Mn—Cr film for Al—O(3)/Ni—Cr—Fe(3)/Ni—Fe(0.4)/Ir—Mn—Cr(7.5)/Ni—Fe(4)/Cu(2.4)/Ta(4) and Al—O(3)/Ni—Cr—Fe(3)/Ni—Fe(0.4)/Ir—Mn—Cr(7.5)/70Co-30Fe(2.4)/Cu(2.4)/Ta(4) films.

Furthermore, the Cr content of the Ir—Mn—Cr longitudinal pinning layer can be varied to attain a designed $H_{UA}$. FIG. 14 shows $H_{CE}$ and $H_{UA}$ versus the Cr content of the Ir—Mn—Cr film for Al—O(3)/Ni—Cr—Fe(3)/Ni—Fe(0.4)/Ir—Mn—Cr(15)/Ni—Fe(4)/Cu(2.4)/Ta(4) and Al—O(3)/Ni—Cr—Fe(3)/Ni—Fe(0.4)/Ir—Mn—Cr(15)/70Co-30Fe(2.4)/Cu(2.4)/Ta(4) films. The $H_{UA}$ decreases with increasing the Cr content of the Ir—Mn—Cr longitudinal pinning layer. The use of a Co—Fe film with the Fe content ranging from 15 to 30 atomic percent has another advantage: the Co—Fe/Ni—Fe/Co—Fe sense layers may be simply replaced by a Co—Fe sense layer with an optimal Fe content and a nearly zero or negative saturation magnetostriction. In summary, to ensure the viability of this invention, it is very crucial to select suitable films with optimal compositions and thicknesses as the seed layers, the longitudinal pinning layers, and the sense layers.

While various embodiments have been described above, it should be understood that they have been presented by way of example only, and not limitation. Other embodiments falling within the scope of this invention may also become apparent to those skilled in the art. Thus, the breadth and scope of this invention should not be limited by any of the above-described exemplary embodiments, but should be defined only in accordance with the following claims and their equivalents.

What is claimed is:

1. A bottom-type giant magnetoresistance (GMR) sensor overlaid with a uniform longitudinal bias (LB) stack, the bottom-type GMR sensor comprising:
nonmagnetic and ferromagnetic seed layers;
an antiferromagnetic transverse pinning layer;
a ferromagnetic first pinned layer;
a first nonmagnetic antiparallel-coupling spacer layer;
a ferromagnetic second pinned layer, the first nonmagnetic antiparallel-coupling spacer layer being sandwiched between the first and second pinned layers;
a nonmagnetic conducting spacer layer; and
a ferromagnetic sense layer, the nonmagnetic conducting spacer layer being sandwiched between the ferromagnetic second pinned layer and the ferromagnetic sense layer;
the uniform longitudinal bias (LB) stack consisting of:
a second nonmagnetic antiparallel-coupling spacer layer;
a ferromagnetic longitudinal pinned layer, the second nonmagnetic antiparallel-coupling spacer layer being sandwiched between the sense layer and the ferromagnetic longitudinal pinned layer;
an antiferromagnetic longitudinal pinning layer in direct contact with and exchange-couple to the ferromagnetic longitudinal pinned layer; and
a nonmagnetic cap layer.

2. A top-type GMR sensor overlying a uniform longitudinal bias (LB) stack;
the uniform longitudinal bias (LB) stack consisting of:
nonmagnetic and ferromagnetic seed layers;
an antiferromagnetic longitudinal pinning layer;
the top-type GMR sensor comprising:
a ferromagnetic sense layer formed over and in direct contact with the longitudinal pinning layer;
a nonmagnetic conducting spacer layer formed over the ferromagnetic sense layer;
a ferromagnetic first pinned layer formed over the nonmagnetic conducting spacer layer;
a nonmagnetic antiparallel-coupling spacer layer formed over the ferromagnetic first pinned layer;
a ferromagnetic second pinned layer formed over the nonmagnetic antiparallel-coupling spacer layer;
an antiferromagnetic transverse pinning layer formed over and exchange coupled to the second ferromagnetic pinned layer; and
a nonmagnetic cap layer.

3. A top-type GMR sensor overlying a uniform longitudinal bias (LB) stack;
the uniform longitudinal bias (LB) stack consisting of:
nonmagnetic and ferromagnetic seed layers;
an antiferromagnetic longitudinal pinning layer;
a ferromagnetic longitudinal pinned layer; and
a first non-magnetic antiparallel-coupling spacer layer formed over the ferromagnetic longitudinal pinned layer;
the top-type GMR sensor comprising:
a ferromagnetic sense layer formed over and in direct contact with the first non-magnetic antiparallel-coupling spacer layer;
a nonmagnetic conducting spacer layer formed over the ferromagnetic sense layer;
a ferromagnetic first pinned layer formed over the nonmagnetic conducting spacer layer;
a second nonmagnetic antiparallel-coupling spacer layer formed over the ferromagnetic first pinned layer;
a ferromagnetic second pinned layer formed over the second nonmagnetic antiparallel-coupling spacer layer;
an antiferromagnetic transverse pinning layer formed over and exchange coupled to the second ferromagnetic pinned layer; and
a nonmagnetic cap layer formed over the antiferromagnetic transverse pinning layer.

4. A GMR sensor as in claims 2 wherein the ferromagnetic longitudinal pinned layer comprises either a ferromagnetic Ni—Fe film with a thickness ranging from 10 to 30 angstroms, or a ferromagnetic Co—Fe film with a thickness ranging from 10 to 20 angstroms.

5. A GMR sensor as in claims 4 wherein the ferromagnetic longitudinal pinned layer comprises either a ferromagnetic Ni—Fe film with a thickness ranging from 10 to 30 angstroms, or a ferromagnetic Co—Fe film with a thickness ranging from 10 to 20 angstroms.

6. A GMR sensor as in claim 2 wherein the nonmagnetic antiparallel-coupling spacer layer used in the uniform LB stack comprises a Ru film with a thickness preferably ranging from 4 to 10 angstroms.

7. A GMR sensor as in claim 4 wherein the nonmagnetic antiparallel-coupling spacer layer used in the uniform LB stack comprises a Ru film with a thickness preferably ranging from 4 to 10 angstroms.

8. A bottom-type tunneling magnetoresistance (TMR) sensor overlaid with a uniform longitudinal bias (LB) stack;
the bottom-type TMR sensor consisting of:
nonmagnetic and ferromagnetic seed layer;
an antiferromagnetic transverse pinning layer;
a ferromagnetic first pinned layer;
a first nonmagnetic antiparallel-coupling spacer layer;
a ferromagnetic second pinned layer;
a nonmagnetic insulating barrier layer; and
a ferromagnetic sense layer;
the uniform longitudinal bias (LB) stack comprising:
a second nonmagnetic antiparallel-coupling spacer layer;
a ferromagnetic longitudinal pinned layer;
an antiferromagnetic longitudinal pinning layer in direct contact with and exchange-couple to the ferromagnetic longitudinal pinned layer; and
a nonmagnetic cap layer.

9. A top-type tunneling magnetoresistance (TMR) sensor overlying a uniform longitudinal bias (LB) stack;
the uniform longitudinal bias (LB) stack consisting of:
nonmagnetic and ferromagnetic seed layers;
an antiferromagnetic longitudinal pinning layer;
the top-type TMR sensor comprising:
a ferromagnetic sense layer in direct contact with the longitudinal pinning layer;
a nonmagnetic insulating barrier layer;
a ferromagnetic first pinned layer;
a nonmagnetic antiparallel-coupling spacer layer;
a ferromagnetic second pinned layer;
an antiferromagnetic transverse pinning layer exchange coupled to the second ferromagnetic pinned layer; and
a nonmagnetic cap layer.

10. A top-type tunneling magnetoresistance (TMR) sensor overlying a uniform longitudinal bias (LB) stack;
the uniform longitudinal bias (LB) stack consisting of:
nonmagnetic and ferromagnetic seed layers;
an antiferromagnetic longitudinal pinning layer;
a ferromagnetic longitudinal pinned layer; and
a first non-magnetic antiparallel-coupling layer;
the top-type TMR sensor comprising:
a ferromagnetic sense layer in direct contact with the first non-magnetic antiparallel-coupling layer;
a nonmagnetic insulating barrier layer;

a ferromagnetic first pinned layer;
a second nonmagnetic antiparallel-coupling spacer layer;
a ferromagnetic second pinned layer;
an antiferromagnetic transverse pinning layer exchange coupled to the second ferromagnetic pinned layer; and
a nonmagnetic cap layer.

11. A TMR sensor as in claims 8, wherein the ferromagnetic longitudinal pinned layer comprises either a ferromagnetic Ni—Fe film with a thickness ranging from 10 to 30 angstroms, or a ferromagnetic Co—Fe film with a thickness ranging from 10 to 20 angstroms.

12. A TMR sensor as in claims 9, wherein the ferromagnetic longitudinal pinned layer comprises either a ferromagnetic Ni—Fe film with a thickness ranging from 10 to 30 angstroms, or a ferromagnetic Co—Fe film with a thickness ranging from 10 to 20 angstroms.

13. A TMR sensor as in claims 8, wherein the nonmagnetic antiparallel-coupling spacer layer used in the uniform LB stack comprises a Ru film with a thickness preferably ranging from 4 to 10 angstroms.

14. A TMR sensor as in claims 9, wherein the nonmagnetic antiparallel-coupling spacer layer used in the uniform LB stack comprises a Ru film with a thickness preferably ranging from 4 to 10 angstroms.

\* \* \* \* \*